United States Patent
Akkarakaran et al.

(10) Patent No.: US 11,778,641 B2
(45) Date of Patent: Oct. 3, 2023

(54) CONFIGURATIONS FOR SIDELINK BEAM MANAGEMENT

(71) Applicant: QUALCOMM Incorporated, San Diego, CA (US)

(72) Inventors: Sony Akkarakaran, Poway, CA (US); Ling Ding, Chester, NJ (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 93 days.

(21) Appl. No.: 17/103,630

(22) Filed: Nov. 24, 2020

(65) Prior Publication Data

US 2021/0160851 A1   May 27, 2021

Related U.S. Application Data

(60) Provisional application No. 62/941,674, filed on Nov. 27, 2019.

(51) Int. Cl.
*H04W 72/51* (2023.01)
*H04W 72/044* (2023.01)
(Continued)

(52) U.S. Cl.
CPC ........... *H04W 72/51* (2023.01); *H04L 5/0051* (2013.01); *H04W 72/044* (2013.01); *H04W 72/21* (2023.01)

(58) Field of Classification Search
CPC ........... H04W 72/048; H04W 72/0413; H04W 72/044; H04W 92/18; H04W 16/28;
(Continued)

(56) References Cited

U.S. PATENT DOCUMENTS

2021/0099847 A1*  4/2021  Uchiyama ............... H04W 4/44
2021/0321267 A1*  10/2021  Kim ...................... H04W 76/28
(Continued)

FOREIGN PATENT DOCUMENTS

WO    WO-2019160973 A1 *  8/2019

OTHER PUBLICATIONS

International Search Report and Written Opinion—PCT/US2020/062423—ISA/EPO—dated Mar. 15, 2021.

*Primary Examiner* — Chae S Lee
(74) *Attorney, Agent, or Firm* — Holland & Hart LLP

(57) ABSTRACT

The described techniques relate to improved methods, systems, devices, and apparatuses that support configurations for sidelink beam management. In some cases, a base station may determine sidelink beams for beam sweeping and instruct a user equipment (UE) which sidelink beams to use. The base station may determine the sidelink beams for beam sweeping based on a report sent from the UE. In other cases, the UE may determine transmission sidelink beams for beam sweeping based on the UE capabilities beam input from the receiving UE, or the base station determining which beams to use and allocating resources for the beam sweeping. Additionally or alternatively, the base station may determine a portion of the sidelink beams for beam sweeping and the UE may determine a portion of the sidelink beams to use for beam sweeping in addition to the beams indicated by the base station.

51 Claims, 16 Drawing Sheets

(51) Int. Cl.
*H04L 5/00* (2006.01)
*H04W 72/21* (2023.01)

(58) Field of Classification Search
CPC ......... H04W 76/14; H04W 4/46; H04W 4/70; H04L 5/0051; H04B 7/0695
See application file for complete search history.

(56) References Cited

U.S. PATENT DOCUMENTS

2021/0360429 A1* 11/2021 Reial .................... H04B 7/0695
2022/0007403 A1* 1/2022 Li .......................... H04W 4/40
2022/0039080 A1* 2/2022 Khoryaev ......... H04W 72/0406

* cited by examiner

CONFIGURATIONS FOR SIDELINK BEAM MANAGEMENT

CROSS REFERENCE

The present application for Patent claims the benefit of U.S. Provisional Patent Application No. 62/941,674 by AKKARAKARAN et al., entitled "CONFIGURATIONS FOR SIDELINK BEAM MANAGEMENT," filed Nov. 27, 2019, assigned to the assignee hereof, and expressly incorporated by reference herein.

FIELD OF TECHNOLOGY

The following relates generally to wireless communications and more specifically to configurations for sidelink beam management.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA, or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

A UE may communicate with a base station or other UEs using beamforming techniques. A UE may have multiple panels (e.g., antenna modules, antenna arrays) which are used to form a communication beam (e.g., a reception beam or transmission beam) to communicate with base stations or other UEs. In some cases, a UE may communicate with other UEs via a sidelink channel.

SUMMARY

The described techniques relate to improved methods, systems, devices, and apparatuses that support configurations for sidelink beam management. Generally, the described techniques provide for beamforming and beam management for sidelink communications. In some cases, a base station may determine sidelink beams for beam training and instruct the UE which sidelink beams to use. The base station may determine the sidelink beams for beam training based on a report (or message) sent from the UE. The beam report may include the beam sweeping capabilities, and in some cases, the UE may determine transmission sidelink beams for beam sweeping based on the beam sweeping capabilities, beam input from the receiving UE, or the base station determining which beams to use and allocating resources for the beam sweeping. Additionally or alternatively, the base station may determine a portion of the sidelink beams for beam sweeping and the UE may determine a portion of the sidelink beams to use for beam sweeping in addition to the beams indicated by the base station.

A method of wireless communications at a first UE is described. The method may include transmitting, to a base station, a report that indicates beam sweeping capabilities of the first UE for a sidelink communications link between the first UE and a second UE, receiving, from the base station, a beam sweeping configuration for the sidelink communications link based on the beam sweeping capabilities indicated by the first UE, and performing a beam sweeping procedure with the second UE based on the beam sweeping configuration.

An apparatus for wireless communications at a first UE is described. The apparatus may include a processor, memory coupled with the processor, and instructions stored in the memory. The instructions may be executable by the processor to cause the apparatus to transmit, to a base station, a report that indicates beam sweeping capabilities of the first UE for a sidelink communications link between the first UE and a second UE, receive, from the base station, a beam sweeping configuration for the sidelink communications link based on the beam sweeping capabilities indicated by the first UE, and perform a beam sweeping procedure with the second UE based on the beam sweeping configuration.

Another apparatus for wireless communications at a first UE is described. The apparatus may include means for transmitting, to a base station, a report that indicates beam sweeping capabilities of the first UE for a sidelink communications link between the first UE and a second UE, receiving, from the base station, a beam sweeping configuration for the sidelink communications link based on the beam sweeping capabilities indicated by the first UE, and performing a beam sweeping procedure with the second UE based on the beam sweeping configuration.

A non-transitory computer-readable medium storing code for wireless communications at a first UE is described. The code may include instructions executable by a processor to transmit, to a base station, a report that indicates beam sweeping capabilities of the first UE for a sidelink communications link between the first UE and a second UE, receive, from the base station, a beam sweeping configuration for the sidelink communications link based on the beam sweeping capabilities indicated by the first UE, and perform a beam sweeping procedure with the second UE based on the beam sweeping configuration.

In some examples of the method, apparatuses, and non-transitory computer-readable medium described herein, transmitting the report that indicates beam sweeping capabilities of the first UE may include operations, features, means, or instructions for transmitting a number of antenna panels of the first UE. In some examples of the method, apparatuses, and non-transitory computer-readable medium described herein, transmitting the report that indicates beam sweeping capabilities of the first UE may include operations, features, means, or instructions for transmitting a number of antenna elements per antenna panel of the first UE.

In some examples of the method, apparatuses, and non-transitory computer-readable medium described herein, transmitting the report that indicates beam sweeping capabilities of the first UE may include operations, features, means, or instructions for transmitting an element type associated with one or more antenna elements of the first UE.

In some examples of the method, apparatuses, and non-transitory computer-readable medium described herein, transmitting the report that indicates beam sweeping capabilities of the first UE may include operations, features, means, or instructions for transmitting a relative orientation of multiple antenna panels of the first UE.

In some examples of the method, apparatuses, and non-transitory computer-readable medium described herein, transmitting the report that indicates beam sweeping capabilities of the first UE may include operations, features, means, or instructions for transmitting form factor information of the first UE, where the form factor information includes an indication of a change in form factor of the first UE, a change in relative location of one or more antenna panels based on the form factor of the first UE, a current form factor of the first UE, one or more external attachments of the first UE, or any combination thereof.

In some examples of the method, apparatuses, and non-transitory computer-readable medium described herein, transmitting the report that indicates beam sweeping capabilities of the first UE may include operations, features, means, or instructions for transmitting a UE capability of the first UE, where the UE capability includes an indication of support for slot-based reception, symbol-based reception, slot-based transmission, symbol-based transmission, a number of beam-switches per slot, or any combination thereof.

In some examples of the method, apparatuses, and non-transitory computer-readable medium described herein, receiving the beam sweeping configuration may include operations, features, means, or instructions for receiving the beam sweeping configuration via downlink control information (DCI), radio resource control (RRC) signaling, or a medium access control (MAC) control element (MAC-CE).

In some examples of the method, apparatuses, and non-transitory computer-readable medium described herein, receiving the beam sweeping configuration may include operations, features, means, or instructions for receiving an indication of a set of transmission beams of the first UE to be used for the beam sweeping procedure.

In some examples of the method, apparatuses, and non-transitory computer-readable medium described herein, performing the beam sweeping procedure with the second UE may include operations, features, means, or instructions for transmitting reference signals to the second UE via the set of transmission beams, transmitting a measurement report of the beam sweeping procedure based on the reference signals, where the measurement report includes measurement information associated with the reference signals, and receiving an indication of one or more next transmission beams from the base station in response to the measurement report, the one or more next transmission beams for subsequent use in the beam sweeping procedure.

Some examples of the method, apparatuses, and non-transitory computer-readable medium described herein may further include operations, features, means, or instructions for transmitting a measurement report of the beam sweeping procedure to the base station, receiving an indication of a transmission beam based on the measurement report, and performing a second beam sweeping procedure using the transmission beam based on the indication.

Some examples of the method, apparatuses, and non-transitory computer-readable medium described herein may further include operations, features, means, or instructions for determining a set of transmission beams of the first UE for the beam sweeping procedure, transmitting, to the base station, an indication of the set of transmission beams, and receiving the beam sweeping configuration in response to the indication, the beam sweeping configuration including time-frequency resources for the set of transmission beams for the beam sweeping procedure.

In some examples of the method, apparatuses, and non-transitory computer-readable medium described herein, the beam sweeping configuration indicates time-frequency resources for a set of transmission beams of the first UE for the beam sweeping procedure, and the beam sweeping procedure may be performed using the indicated time-frequency resources.

Some examples of the method, apparatuses, and non-transitory computer-readable medium described herein may further include operations, features, means, or instructions for transmitting, to the base station, a request to use a first number of transmission beams in the beam sweeping procedure, and receiving the beam sweeping configuration in response to the request, the beam sweeping configuration including a second number of transmission beams for the beam sweeping procedure. In some examples of the method, apparatuses, and non-transitory computer-readable medium described herein, the first number may be the same as the second number.

In some examples of the method, apparatuses, and non-transitory computer-readable medium described herein, the first number may be based on a number of beam switches the first UE may be capable of performing within a transmission time interval.

Some examples of the method, apparatuses, and non-transitory computer-readable medium described herein may further include operations, features, means, or instructions for determining a set of transmission beams of the first UE for the beam sweeping procedure, determining a requested beam sweeping pattern including transmission beam repetition for beam sweeping at the second UE for the set of transmission beams, and transmitting, to the base station, the requested beam sweeping pattern for performing the beam sweeping procedure.

Some examples of the method, apparatuses, and non-transitory computer-readable medium described herein may further include operations, features, means, or instructions for receiving the beam sweeping configuration in response to a requested beam sweeping pattern, the beam sweeping configuration including time-frequency resources for the set of transmission beams for the beam sweeping procedure in accordance with the beam sweeping pattern.

In some examples of the method, apparatuses, and non-transitory computer-readable medium described herein, receiving the beam sweeping configuration may include operations, features, means, or instructions for receiving an indication of a first subset of transmission beams of the first UE to be used for the beam sweeping procedure, selecting a second subset of transmission beams of the first UE to be used for the beam sweeping procedure, and performing the beam sweeping procedure using the first and second subsets of transmission beams.

A method of wireless communications at a base station is described. The method may include receiving, from a first UE, a report that indicates beam sweeping capabilities of the first UE for a sidelink communications link between the first UE and a second UE, determining a beam sweeping configuration for the sidelink communications link based on the beam sweeping capabilities indicated by the first UE, and transmitting, to the first UE, the beam sweeping configuration for a beam sweeping procedure between the first UE and the second UE.

An apparatus for wireless communications at a base station is described. The apparatus may include a processor, memory coupled with the processor, and instructions stored in the memory. The instructions may be executable by the processor to cause the apparatus to receive, from a first UE, a report that indicates beam sweeping capabilities of the first UE for a sidelink communications link between the first UE and a second UE, determine a beam sweeping configuration for the sidelink communications link based on the beam sweeping capabilities indicated by the first UE, and transmit, to the first UE, the beam sweeping configuration for a beam sweeping procedure between the first UE and the second UE.

Another apparatus for wireless communications at a base station is described. The apparatus may include means for receiving, from a first UE, a report that indicates beam sweeping capabilities of the first UE for a sidelink communications link between the first UE and a second UE, determining a beam sweeping configuration for the sidelink communications link based on the beam sweeping capabilities indicated by the first UE, and transmitting, to the first UE, the beam sweeping configuration for a beam sweeping procedure between the first UE and the second UE.

A non-transitory computer-readable medium storing code for wireless communications at a base station is described. The code may include instructions executable by a processor to receive, from a first UE, a report that indicates beam sweeping capabilities of the first UE for a sidelink communications link between the first UE and a second UE, determine a beam sweeping configuration for the sidelink communications link based on the beam sweeping capabilities indicated by the first UE, and transmit, to the first UE, the beam sweeping configuration for a beam sweeping procedure between the first UE and the second UE.

In some examples of the method, apparatuses, and non-transitory computer-readable medium described herein, receiving the report that indicates beam sweeping capabilities of the first UE may include operations, features, means, or instructions for receiving a number of antenna panels of the first UE.

In some examples of the method, apparatuses, and non-transitory computer-readable medium described herein, receiving the report that indicates beam sweeping capabilities of the first UE may include operations, features, means, or instructions for receiving a number of antenna elements per antenna panel of the first UE.

In some examples of the method, apparatuses, and non-transitory computer-readable medium described herein, receiving the report that indicates beam sweeping capabilities of the first UE may include operations, features, means, or instructions for receiving an element type associated with one or more antenna elements of the first UE.

In some examples of the method, apparatuses, and non-transitory computer-readable medium described herein, receiving the report that indicates beam sweeping capabilities of the first UE may include operations, features, means, or instructions for receiving a relative orientation of multiple antenna panels of the first UE.

In some examples of the method, apparatuses, and non-transitory computer-readable medium described herein, receiving the report that indicates beam sweeping capabilities of the first UE may include operations, features, means, or instructions for receiving form factor information of the first UE, where the form factor information includes an indication of a change in form factor of the first UE, a change in relative location of one or more antenna panels based on the form factor of the first UE, a current form factor of the first UE, one or more external attachments of the first UE, or any combination thereof.

In some examples of the method, apparatuses, and non-transitory computer-readable medium described herein, receiving the report that indicates beam sweeping capabilities of the first UE may include operations, features, means, or instructions for receiving a UE capability of the first UE, where the UE capability includes an indication of support for slot-based reception, symbol-based reception, slot-based transmission, symbol-based transmission, a number of beam-switches per slot, or any combination thereof.

In some examples of the method, apparatuses, and non-transitory computer-readable medium described herein, transmitting the beam sweeping configuration may include operations, features, means, or instructions for transmitting the beam sweeping configuration via DCI, RRC signaling, or a MAC-CE.

In some examples of the method, apparatuses, and non-transitory computer-readable medium described herein, transmitting the beam sweeping configuration may include operations, features, means, or instructions for transmitting an indication of a set of transmission beams of the first UE to be used for the beam sweeping procedure.

Some examples of the method, apparatuses, and non-transitory computer-readable medium described herein may further include operations, features, means, or instructions for receiving a measurement report of the beam sweeping procedure based on the indication, where the measurement report includes measurement information associated with one or more reference signals as part of the beam sweeping procedure, and transmitting a next transmission beam to the first UE in response to the measurement report, the next transmission beam for subsequent use in the beam sweeping procedure.

Some examples of the method, apparatuses, and non-transitory computer-readable medium described herein may further include operations, features, means, or instructions for receiving a measurement report of the beam sweeping procedure from the first UE or the second UE, and transmitting an indication of a transmission beam for a second beam sweeping procedure based on the measurement report.

Some examples of the method, apparatuses, and non-transitory computer-readable medium described herein may further include operations, features, means, or instructions for receiving, from the first UE, an indication of a set of transmission beams of the first UE for the beam sweeping procedure, and transmitting the beam sweeping configuration for the set of transmission beams for the beam sweeping procedure in the beam sweeping configuration.

In some examples of the method, apparatuses, and non-transitory computer-readable medium described herein, the beam sweeping configuration indicates time-frequency resources for the set of transmission beams of the first UE for the beam sweeping procedure.

Some examples of the method, apparatuses, and non-transitory computer-readable medium described herein may further include operations, features, means, or instructions for receiving, from the first UE, a request to use a first number of transmission beams for the beam sweeping procedure, and transmitting a second number of transmission beams for the beam sweeping procedure in the beam sweeping configuration based on the request.

In some examples of the method, apparatuses, and non-transitory computer-readable medium described herein, the first number may be the same as the second number. In some examples of the method, apparatuses, and non-transitory computer-readable medium described herein, the first number may be based on a number of beam switches the first UE may be capable of performing within a transmission time interval.

Some examples of the method, apparatuses, and non-transitory computer-readable medium described herein may further include operations, features, means, or instructions for receiving, from the first UE, a requested beam sweeping pattern for performing the beam sweeping procedure, the requested beam sweeping pattern including transmission beam repetition for beam sweeping at the second UE, and transmitting the beam sweeping configuration in response to the control message.

In some examples of the method, apparatuses, and non-transitory computer-readable medium described herein, the beam sweeping configuration includes time-frequency resources for the requested beam sweeping pattern for the beam sweeping procedure.

A method of wireless communications at a receive UE is described. The method may include receiving, as part of a beam training procedure for a sidelink communications link, reference signals from a transmit UE via the sidelink communications link and transmitting, to a base station or the transmit UE, a measurement report of the beam sweeping procedure based on the reference signals, where the measurement report includes measurement information associated with the reference signals.

An apparatus for wireless communications at a receive UE is described. The apparatus may include a processor, memory coupled with the processor, and instructions stored in the memory. The instructions may be executable by the processor to cause the apparatus to receive, as part of a beam training procedure for a sidelink communications link, reference signals from a transmit UE via the sidelink communications link and transmit, to a base station or the transmit UE, a measurement report of the beam sweeping procedure based on the reference signals, where the measurement report includes measurement information associated with the reference signals.

Another apparatus for wireless communications at a receive UE is described. The apparatus may include means for receiving, as part of a beam training procedure for a sidelink communications link, reference signals from a transmit UE via the sidelink communications link and transmitting, to a base station or the transmit UE, a measurement report of the beam sweeping procedure based on the reference signals, where the measurement report includes measurement information associated with the reference signals.

A non-transitory computer-readable medium storing code for wireless communications at a receive UE is described. The code may include instructions executable by a processor to receive, as part of a beam training procedure for a sidelink communications link, reference signals from a transmit UE via the sidelink communications link and transmit, to a base station or the transmit UE, a measurement report of the beam sweeping procedure based on the reference signals, where the measurement report includes measurement information associated with the reference signals.

In some examples of the method, apparatuses, and non-transitory computer-readable medium described herein, the measurement report includes one or more reference signals communicated over the sidelink communications link and associated reception beams for each of the one or more reference signals.

DETAILED DESCRIPTION

Figure 1:
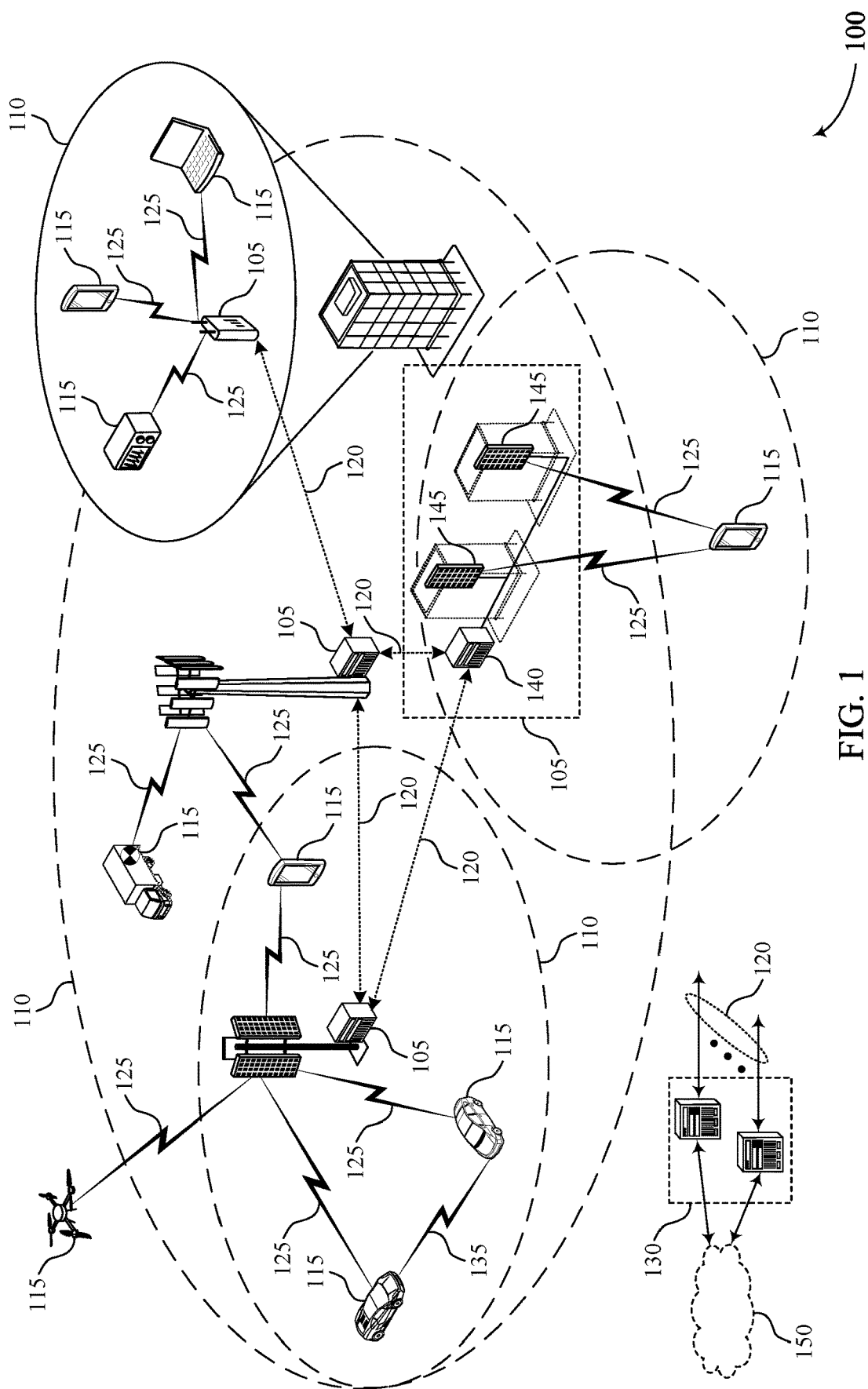
FIG. 1 illustrates an example of a wireless communications system that supports configurations for sidelink beam management in accordance with aspects of the present disclosure.

A wireless communications system may support both access links and sidelinks for communications between wireless devices. An access link may refer to a communication link between a UE and a base station. For example, an access link may support uplink signaling, downlink signaling, connection procedures, etc. A sidelink may refer to any communication link between similar wireless devices (e.g., a communication link between UEs, a backhaul communication link between base stations, etc.). It is noted that while various examples provided herein are discussed for UE sidelink devices, such sidelink techniques may be used for any type of wireless devices that use sidelink communications. For example, a sidelink may support device-to-device (D2D) communications, vehicle-to-everything (V2X) or vehicle-to-vehicle (V2V) communications, message relaying, discovery signaling, beacon signaling, or any combination of these or other signals transmitted over-the-air from one wireless device to one or more other wireless devices.

As demand for sidelink communication increases (e.g., due to increased V2X demand for autonomous and semi-autonomous vehicles, D2D communication between Internet-of-Things (IoT) devices, factory automation, etc.), techniques to efficiently and reliably enhance throughput and reliability of sidelink channels is desirable. Techniques such as discussed in various aspects of the present disclosure provide for beam management for sidelink communications.

Base stations and UEs may perform beam training procedures which may include beam sweeping procedures for sidelink communications.

In some cases, a base station may determine sidelink beams (e.g., transmission or reception beams) for UE beam training and instruct the UE which sidelink beams to use. The base station may determine the sidelink beams for beam training based on a report sent from the UE. The report may include the beam sweeping capabilities of the UE, and in some cases, the UE may determine transmission sidelink beams for beam sweeping based on the beam sweeping capabilities, beam input from the receiving UE, or the base station determining which beams to use and allocating resources for the beam sweeping. Additionally or alternatively, the base station may determine a portion of the sidelink beams for beam sweeping and the UE may determine a portion of the sidelink beams to use for beam sweeping in addition to the beams indicated by the base station.

Particular aspects of the subject matter described herein may be implemented to realize one or more advantages. The described techniques may support improvements in sidelink beam management, decreasing signaling overhead, and improving reliability, among other advantages. As such, supported techniques may include improved network operations and, in some examples, may promote network efficiencies, among other benefits.

Aspects of the disclosure are initially described in the context of wireless communications systems. Additionally, aspects of the disclosure are illustrated through an additional wireless communications system, examples of beam sweeping configurations and a process flow. Aspects of the disclosure are further illustrated by and described with reference to apparatus diagrams, system diagrams, and flowcharts that relate to configurations for sidelink beam management.

FIG. 1 illustrates an example of a wireless communications system 100 that supports configurations for sidelink beam management in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beamforming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some cases, a base station 105 may determine sidelink beams for UE 115 beam training and instruct the UE 115 which sidelink beams to use. The base station 105 may determine the sidelink beams for beam training based on a report sent from the UE 115. The beam report may include the beam sweeping capabilities of the UE 115, which may include antenna panel location, antenna panel orientation, dynamic form factor, or other UE capabilities such as the number of beam switches capable of being performed in a slot, support for slot-based reception, symbol-based reception, slot-based transmission, or symbol-based transmission, among others. In some cases, the UE 115 may determine transmission sidelink beams for beam sweeping based on the beam sweeping capabilities of the UE 115, beam input from the receiving UE 115, or the base station 105 determining which beams to use and allocating resources for the beam sweeping. Additionally or alternatively, the base station 105 may determine a portion of the sidelink beams for beam sweeping and the UE 115 may determine a portion of the sidelink beams to use for beam sweeping in addition to the beams indicated by the base station 105.

Figure 2:
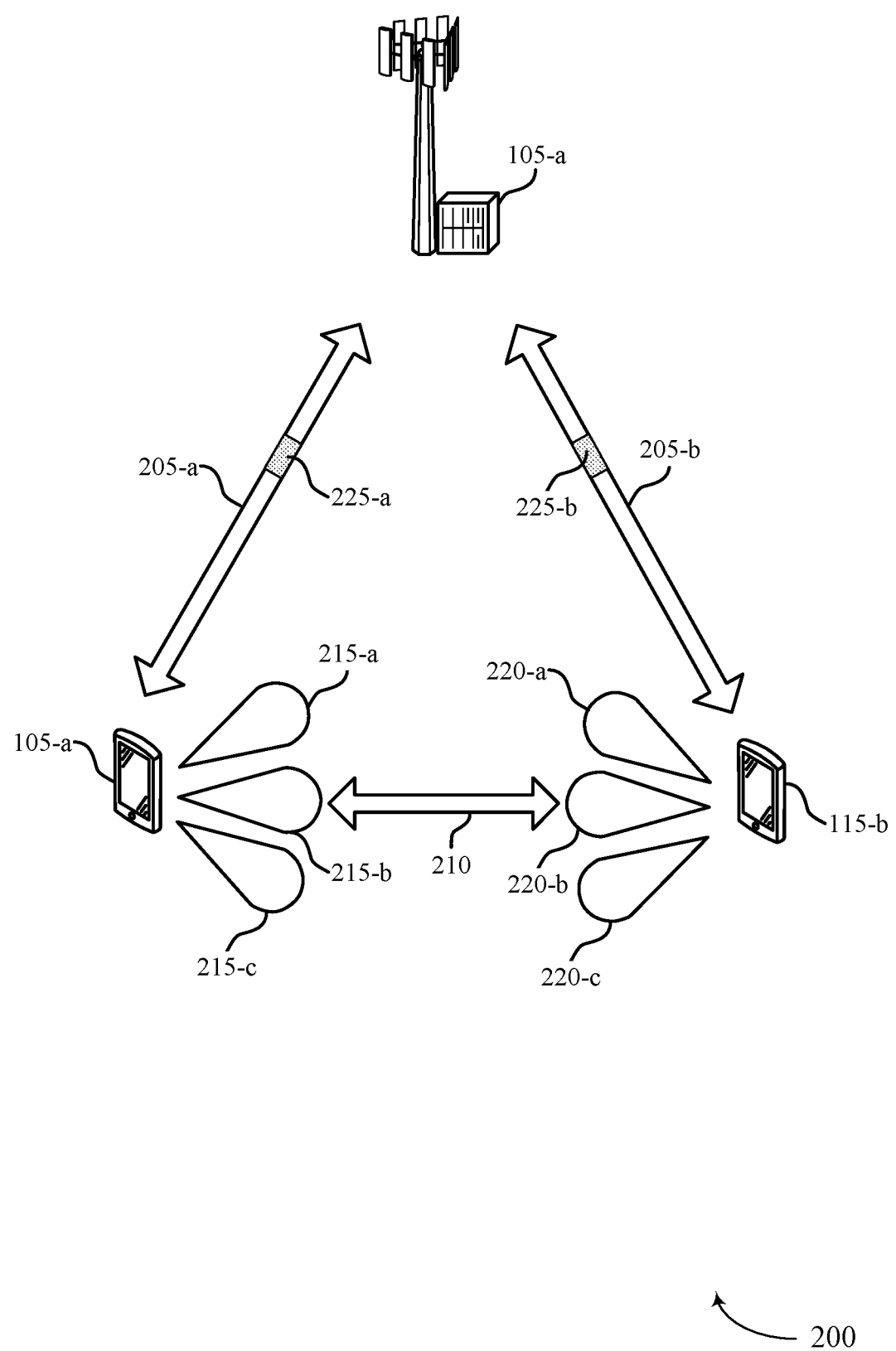
FIG. 2 illustrates an example of a wireless communications system that supports configurations for sidelink beam management in accordance with aspects of the present disclosure.

FIG. 2 illustrates an example of a wireless communications system 200 that supports configurations for sidelink beam management in accordance with aspects of the present disclosure. In some examples, wireless communications system 200 may implement aspects of wireless communications system 100. In some examples, the wireless communications system 200 may include a UE 115-a, a UE 115-b, and base station 105-a which may be examples of UEs 115 and base stations 105 described with reference to FIG. 1. One or more of the UEs 115 may communicate with the base station 105-a using a corresponding access link 205 (e.g., Uu interface). In this example, the base station 105-a may communicate with UE 115-a via access link 205-a, and may communicate with UE 115-b via access link 205-b.

UE 115-a and UE 115-b may communicate via sidelink 210 using beamformed or directional transmissions, and non-beamformed transmissions. For example, UE 115-a may send transmissions to UE 115-b using a beamformed transmission beam 215, which may be one of a number of transmission beams used by the base station 105-a, such as transmission beams 215-a, 215-b, and 215-c. UE 115-b may receive transmissions from UE 115-a using a beamformed reception beam 220, which may be one of a number of reception beams used by the UE 115-b, such as reception beams 220-a, 220-b, and 220-c.

In some examples, base station 105-a may be considered a controlling UE, where the controlling UE acts as the scheduling entity for the sidelink communications with the UEs 115. That is, the sidelink communications may be controlled (e.g., coordinated, scheduled, allocated, etc.) by a controlling UE with respect to the sidelink communications being performed between UE 115-a and UE 115-b. Accordingly, a controlling UE may schedule and allocate the appropriate resources and convey those resources to the UEs 115. In some cases, base station 105-a may be considered a controlling UE when the controlling UE and the UE 115-a (e.g., and one or more other UEs served or otherwise controlled by the controlling UE) are out of base station coverage (e.g., such as a programmable logic controller (PLC) in an industrial Internet-of-Things (IIoT) scenario). The controlling UE may thus be designated as a master or anchor UE, and may act as the scheduling entity for the UEs 115 and any other UEs controlled by the controlling UE.

UE 115-a or UE 115-b may transmit to base station 105-a report 225-a and 225-b indicating the beam sweeping capabilities of UE 115-a or UE 115-b. In some examples, UE beam sweeping capabilities may indicate slot-based reception, symbol-based reception, slot-based transmission, symbol-based transmission, or a number of beam-switches per slot. In some examples, the UE beam sweeping capabilities may indicate a number of receive beams the UE 115-a and/or UE 115-b is capable of receiving per transmission time interval (e.g., per symbol, per slot, etc.). In some examples, the UE beam sweeping capabilities may indicate a number of transmission beams the UE 115-a and/or UE 115-b is capable of utilizing to transmit per transmission time interval (e.g., per symbol, per slot, etc.). In some examples, UE beam sweeping capabilities may include static and dynamic parameters. Static parameters may include parameters which the UE 115 may report to base station 105-a, such as the number of antenna panels, the number of antenna elements per antenna panel, or the element type associated with one or more antenna elements (e.g., patch or dipole). Dynamic parameters may include parameters which the UE 115 may report dynamically with updated results to base station 105-a, such as the relative orientation of the antenna panels on the device (e.g., UE 115-a or UE 115-b). The orientation of the antenna panels on the UE 115-a or UE 115-b may be due to the antennas being at the corners of the device, along the edges of the device, or a dynamic form-factor. The dynamic form-factor (e.g., UE 115-a or UE 115-b being a foldable device) may indicate the changes of the form of the phone (e.g., folded or unfolded), or the location of the antenna panels on each subsection of the device (e.g., the two sections of the device that fold relative to each other). Additionally or alternatively, the dynamic form factor may indicate add-on external attachments (e.g., card reader, headphones, etc.)

In some examples, base station 105-a may determine a beam sweeping configuration for UE 115-a and UE 115-b based on the beam reports 225-a and 225-b or the potential interference between the configured beams and Uu traffic. UE 115-a and UE 115-b may perform a beam training procedure based on the beam sweeping configuration. The beam training procedure include a training mode 1 procedure, a training mode 2 procedure, or a training mode 3 procedure. In some examples, the beam training procedure may include a beam sweeping procedure.

In training mode 1 procedure, base station 105-a may determine the sidelink transmission beams and/or reception beams for UE 115-a and UE 115-b for beam training. For example, base station 105-a may select sidelink beams for beam training based on the beam report (e.g., configuration parameters in the beam report). In some examples, such as mobility scenarios, base station 105-a may determine the beam sweeping configuration (e.g., sidelink transmission or reception beams) based on the dynamic parameters such as the current orientation (e.g., variable or current form factor) of UE 115-a or UE 115-b. Base station 105-a may send the beam sweeping configuration to UE 115-a via downlink control information (DCI), RRC signaling, or a MAC control element (MAC-CE). Base station 105-a may transmit an indication of a set of transmission beams (e.g., transmission beams 215-a, 215-b, and 215-c) of UE 115-a to use during the beam sweeping procedure.

During beam sweeping procedure, UE 115-a and UE 115-b may send the measurement results of the beam sweeping procedure to base station 105-a in one or more measurement reports. A measurement report may include measurement information associated with one or more reference signals as part of the beam sweeping procedure. Base station 105-a may use the measurement results to determine the next transmission (or input beam) for subsequent use in the beam sweeping procedure and send an indication of the transmission beam to UE 115-a. UE 115-a may perform a second beam sweeping procedure using the transmission beam based on the indication.

In training mode 2 procedure, UE 115-a and UE 115-b may determine the sidelink transmission and/or reception beams to use for beam training based on the beamforming capability of the UE 115-a and/or UE 115-b. UE 115-a and UE 115-b may send, to base station 105-a, an indication of the number of sidelink beams being requested, and base station 105-a may schedule the time-frequency resources for the indicated number of sidelink beams. UE 115-a and UE 115-b may determine the sidelink beams based on the one or more beams reports that include, for example, the static and dynamic configuration parameters. In some cases, UE 115-a and UE 115-b may determine and request a number of sidelink beams from base station 105-a without sending beam report 225-a or 225-b. UE 115-a may send base station 105-a a control message indicating set of transmission beams with a requested beam sweeping pattern including transmission beam repetition for beam sweeping at UE 115-b. In some cases, the UE may request in the control message a certain ordering of transmission beam sweeping relative to transmission beam repetition. The transmission beam repetition may be used, for example, for receive beam sweeping. In some cases, UE 115-a and UE 115-b may determine the number of sidelink transmission and/or receive beams to request based on the number of beam switches that the UE 115-a and UE 115-b is capable of performing within a transmission time interval, such as in a slot.

During beam sweeping procedure, the sidelink transmission UE 115 (e.g., UE 115-a) may use beam input information from the receiving UE 115 (e.g., UE 115-b) in beam selection. UE 115-b may send the beam input information to UE 115-a over sidelink 210 (e.g., sidelink RRC, sidelink control information (SCI) or MAC-CE). In some examples, base station 105-a may send the beam input information to UE 115-a (e.g., in the DCI).

In training mode 3 procedure (e.g., a mixture of training mode 1 and 2), base station 105-a, UE 115-a, or UE 115-b may determine the sidelink transmission or reception beams. For example, base station 105-a may determine a portion of the sidelink transmission or reception beams for UE beam training (e.g., in accordance with training mode 1) and UE 115-a or UE 115-b may determine a portion of the sidelink transmission or reception beams for UE beam training (e.g., in accordance with training mode 2). In some examples, base station 105-a may determine a list of transmission or reception beams which UE 115-a or UE 115-b may select from for communications. In other examples, base station 105-a may determine a list of transmission or reception beams, and UE 115-a or UE 115-b may select a portion of the list and determine beams.

In some examples, during the beam sweeping procedure, the transmitting UE (e.g., UE 115-a) may transmit reference signals to the reception UE via the sidelink 210. UE 115-b may send, to base station 105-a or UE 115-a, a measurement report of the beam sweeping procedure based on the reference signals, where the measurement report includes measurement information associated with the reference signals. In some examples, the measurement report includes one or more reference signals communicated over the sidelink 210 and associated reception beams (e.g., reception beams 220-a, 220-b, and 220-c) for each of the one or more reference signals.

Figure 3:
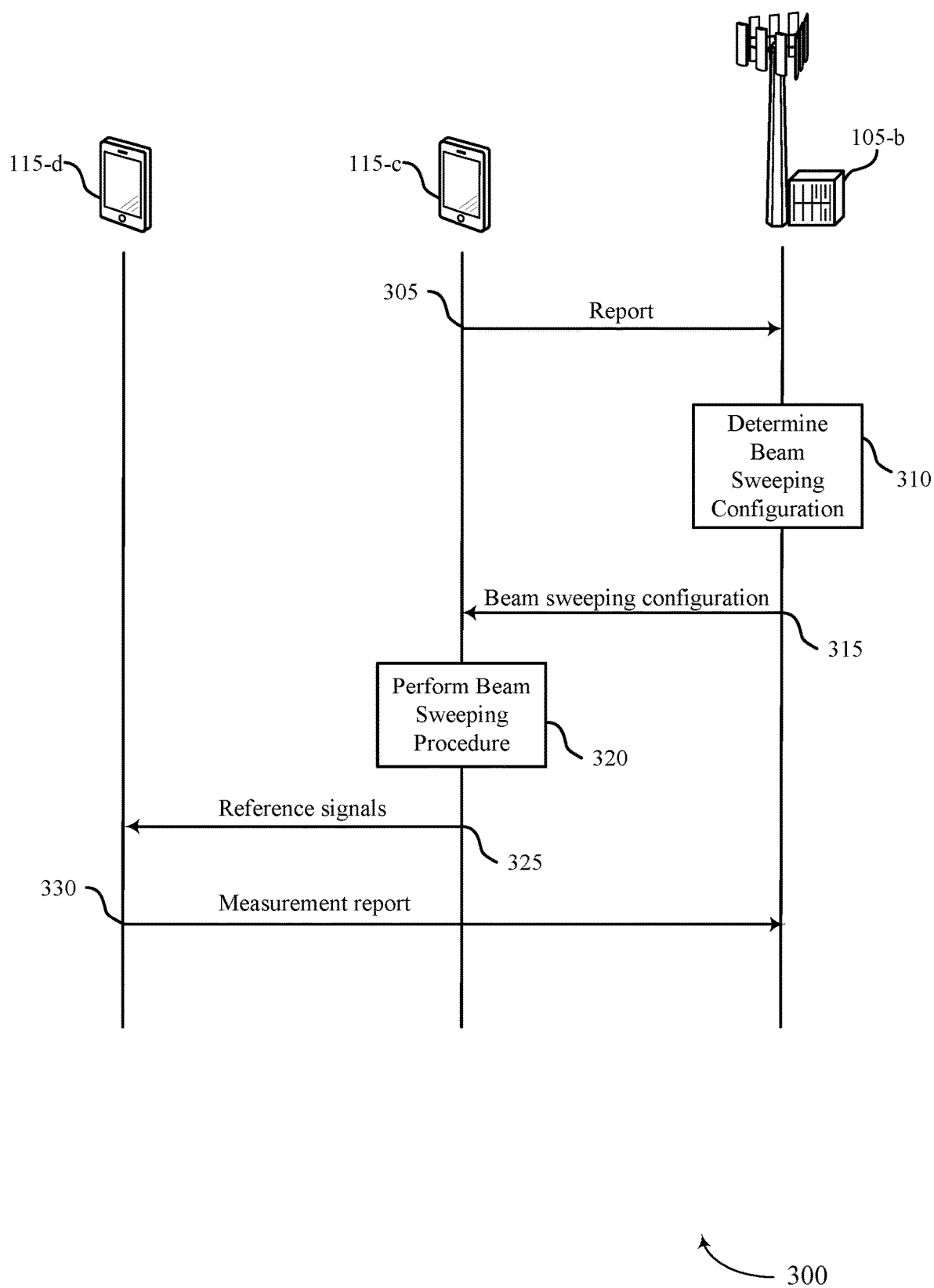
FIG. 3 illustrates an example of a process flow that supports configurations for sidelink beam management in accordance with aspects of the present disclosure.

FIG. 3 illustrates an example of a process flow 300 that supports configurations for sidelink beam management in accordance with aspects of the present disclosure. In some examples, process flow 300 may implement aspects of wireless communications systems 100 or 200. In some examples, the process flow 300 may include a UE 115-c, a UE 115-d, and base station 105-b which may be examples of UEs 115 and base stations 105 described with reference to FIGS. 1 and 2.

At 305, UE 115-c may transmit, to base station 105-b, a report that indicates beam sweeping capabilities of UE 115-c for a sidelink communications link between UE 115-c and UE 115-d. The report may include a number of antenna panels of UE 115-c, a number of antenna elements per antenna panel of UE 115-c, an element type associated with one or more antenna elements of UE 115-c, a relative orientation of multiple antenna panels of UE 115-c, form factor information of UE 115-c (e.g., where the form factor information includes an indication of a change in form factor of UE 115-c), a change in relative location of one or more antenna panels based on the form factor of UE 15-a, a current form factor of UE 115-c, one or more external attachments of UE 115-c, or any combination thereof. In some examples, the report may include other beam sweeping capabilities of the UE such as UE capability including an indication of support for slot-based reception, symbol-based reception, slot-based transmission, symbol-based transmission, a number of beam-switches per slot, or any combination thereof.

In some examples, UE 115-c may determine a set of transmission beams of UE 115-c for the beam sweeping procedure, determine a requested beam sweeping pattern including transmission beam repetition for beam sweeping at UE 115-d for the set of transmission beams, and transmit, to base station 105-b, the requested beam sweeping pattern in a control message for performing the beam sweeping procedure. Base station 105-b may transmit the beam sweeping configuration in response to the control message.

At 310, base station 105-b may determine a beam sweeping configuration for the sidelink communications link based on the beam sweeping capabilities indicated by UE 115-c. In some examples, UE 115-c may determine a set of transmission beams of UE 115-c for the beam sweeping procedure, transmit, to base station 105-b, an indication of the set of transmission beams, and receive, from base station 105-b, the beam sweeping configuration in response to the indication, where the beam sweeping configuration including time-frequency resources for the set of transmission beams for the beam sweeping procedure. The beam sweeping configuration may indicate time-frequency resources for a set of transmission beams of UE 115-c for the beam sweeping procedure and UE 115-c may perform the beam sweeping procedure using the indicated time-frequency resources.

In some examples, UE 115-c may transmit, to base station 105-b, a request to use a first number of transmission beams in the beam sweeping procedure and receive the beam sweeping configuration in response to the request, where the beam sweeping configuration includes a second number of transmission beams for the beam sweeping procedure. In some cases, the first number may be the same as the second number, or the first number may be based on a number of beam switches UE 115-c is capable of performing within a transmission time interval.

At 315, base station 105-a may transmit, to UE 115-c, the beam sweeping configuration for a beam sweeping procedure between UE 115-c and UE 115-d. In some examples, UE 115-c may receive the beam sweeping configuration via DCI, RRC signaling, or a MAC-CE. In some examples, base station 105-b may receive an indication of a set of transmission beams of UE 115-c to be used for the beam sweeping procedure. In some examples, UE 115-c may receive the beam sweeping configuration in response to a requested beam sweeping pattern, the beam sweeping configuration including time-frequency resources for the set of transmission beams for the beam sweeping procedure in accordance with the beam sweeping pattern.

In some examples, UE 115-c receiving the beam sweeping configuration may include receiving an indication of a first subset of transmission beams of UE 115-c to be used for the beam sweeping procedure, selecting a second subset of transmission beams of UE 115-c to be used for the beam sweeping procedure, and performing the beam sweeping procedure using the first and second subsets of transmission beams.

At 320, UE 115-c may perform a beam sweeping procedure with UE 115-d based on the beam sweeping configuration. In some examples, performing the beam sweeping procedure with UE 115-d may include transmitting reference signals to UE 115-c via the set of transmission beams, transmitting a measurement report of the beam sweeping procedure based on the reference signals, where the measurement report includes measurement information associated with the reference signals, and receiving an indication of one or more next transmission beams from base station 105-b in response to the measurement report, the one or more next transmission beams for subsequent use in the beam sweeping procedure.

In some examples, UE 115-c or UE 115-d may transmit a measurement report of the beam sweeping procedure to base station 105-b, receive, from base station 105-b, an indication of a transmission beam based on the measurement report, and perform a second beam sweeping procedure using the transmission beam based on the indication.

At 325, UE 115-d may receive, as part of the beam training procedure for a sidelink communications link, reference signals from UE 115-c via the sidelink communications link.

At 330, UE 115-d may transmit, to base station 105-b or UE 115-c, a measurement report of the beam sweeping procedure based on the reference signals, where the measurement report includes measurement information associated with the reference signals. In some examples, the measurement report may include one or more reference signals communicated over the sidelink communications link and associated reception beams for each of the one or more reference signals.

Figure 4:
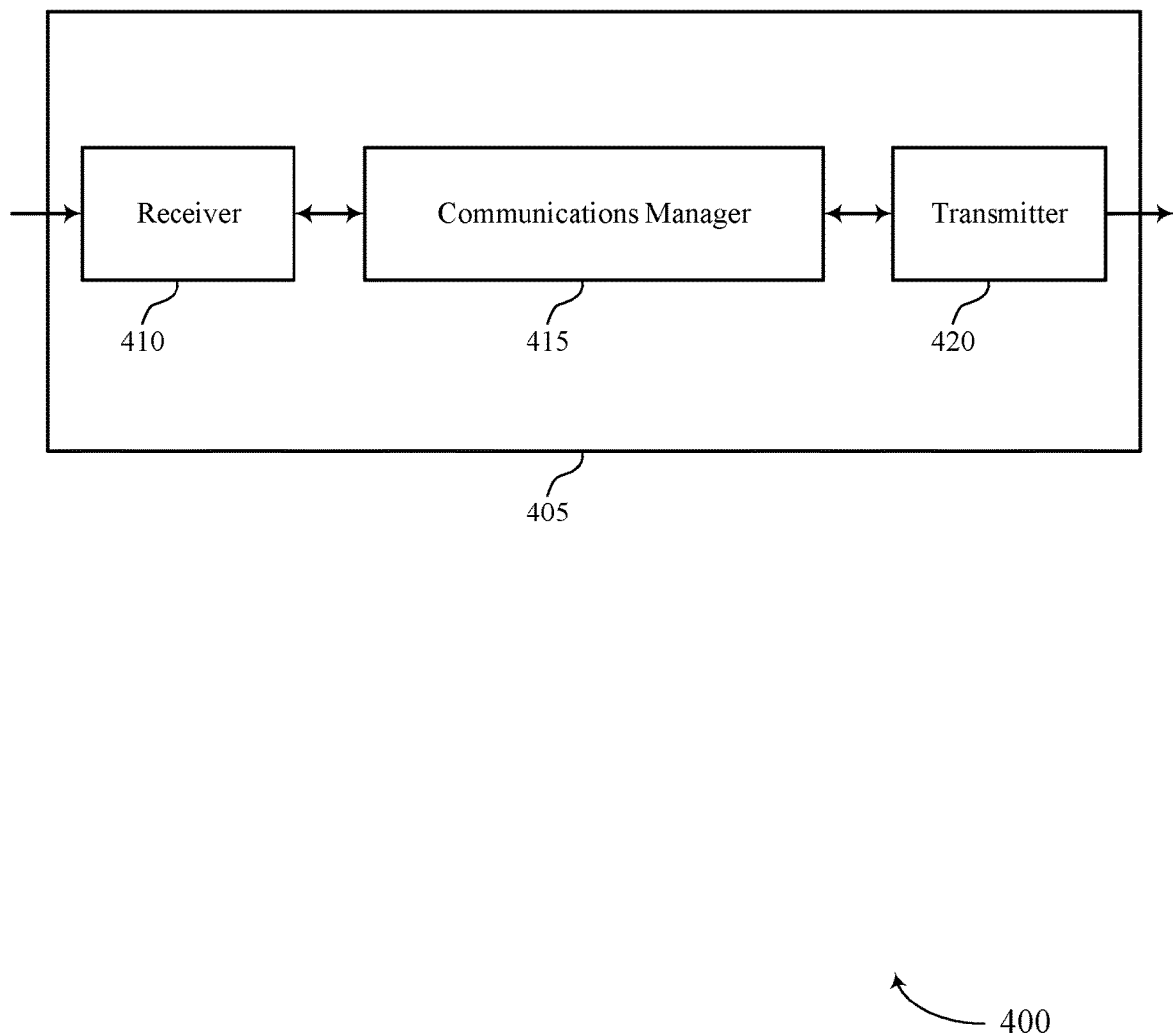
FIGS. 4 and 5 show block diagrams of devices that support configurations for sidelink beam management in accordance with aspects of the present disclosure.

FIG. 4 shows a block diagram 400 of a device 405 that supports configurations for sidelink beam management in accordance with aspects of the present disclosure. The device 405 may be an example of aspects of a UE 115 as described herein. The device 405 may include a receiver 410, a communications manager 415, and a transmitter 420. The device 405 may also include a processor. Each of these components may be in communication with one another (e.g., via one or more buses).

The receiver 410 may receive information such as packets, user data, or control information associated with various information channels (e.g., control channels, data channels, and information related to configurations for sidelink beam management, etc.). Information may be passed on to other components of the device 405. The receiver 410 may be an example of aspects of the transceiver 720 described with reference to FIG. 7. The receiver 410 may utilize a single antenna or a set of antennas.

The communications manager 415 may transmit, to a base station, a report that indicates beam sweeping capabilities of the first UE for a sidelink communications link between the first UE and a second UE, receive, from the base station, a beam sweeping configuration for the sidelink communications link based on the beam sweeping capabilities indicated by the first UE, and perform a beam sweeping procedure with the second UE based on the beam sweeping configuration. The communications manager 415 may also receive, as part of a beam training procedure for a sidelink communications link, reference signals from a transmit UE via the sidelink communications link and transmit, to a base station or the transmit UE, a measurement report of the beam sweeping procedure based on the reference signals, where the measurement report includes measurement information associated with the reference signals. The communications manager 415 may be an example of aspects of the communications manager 710 described herein.

The communications manager 415, or its sub-components, may be implemented in hardware, code (e.g., software or firmware) executed by a processor, or any combination thereof. If implemented in code executed by a processor, the functions of the communications manager 415, or its sub-components may be executed by a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described in the present disclosure.

The communications manager 415, or its sub-components, may be physically located at various positions, including being distributed such that portions of functions are implemented at different physical locations by one or more physical components. In some examples, the communications manager 415, or its sub-components, may be a separate and distinct component in accordance with various aspects of the present disclosure. In some examples, the communications manager 415, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 420 may transmit signals generated by other components of the device 405. In some examples, the transmitter 420 may be collocated with a receiver 410 in a transceiver module. For example, the transmitter 420 may be an example of aspects of the transceiver 720 described with reference to FIG. 7. The transmitter 420 may utilize a single antenna or a set of antennas.

In some examples, the communications manager 415 may be implemented as an integrated circuit or chipset for a mobile device modem, and the receiver 410 and transmitter 420 may be implemented as analog components (e.g., amplifiers, filters, antennas) coupled with the mobile device modem to enable wireless transmission and reception over one or more bands.

The communications manager 415 as described herein may be implemented to realize one or more potential advantages. One implementation may allow the device 405 to receive a beam sweeping configuration for a sidelink communications link with another device. The device 405 may perform a beam sweeping procedure with the other device based on the beam sweeping configuration. This beam sweeping procedure may increase reliability and reduce latency during sidelink communications.

Based on techniques for implementing sidelink beam management as described herein, a processor of a UE 115 (e.g., controlling the receiver 410, the transmitter 420, or the transceiver 720 as described with reference to FIG. 7) may increase reliability and decrease signaling overhead in sidelink communications.

Figure 5:
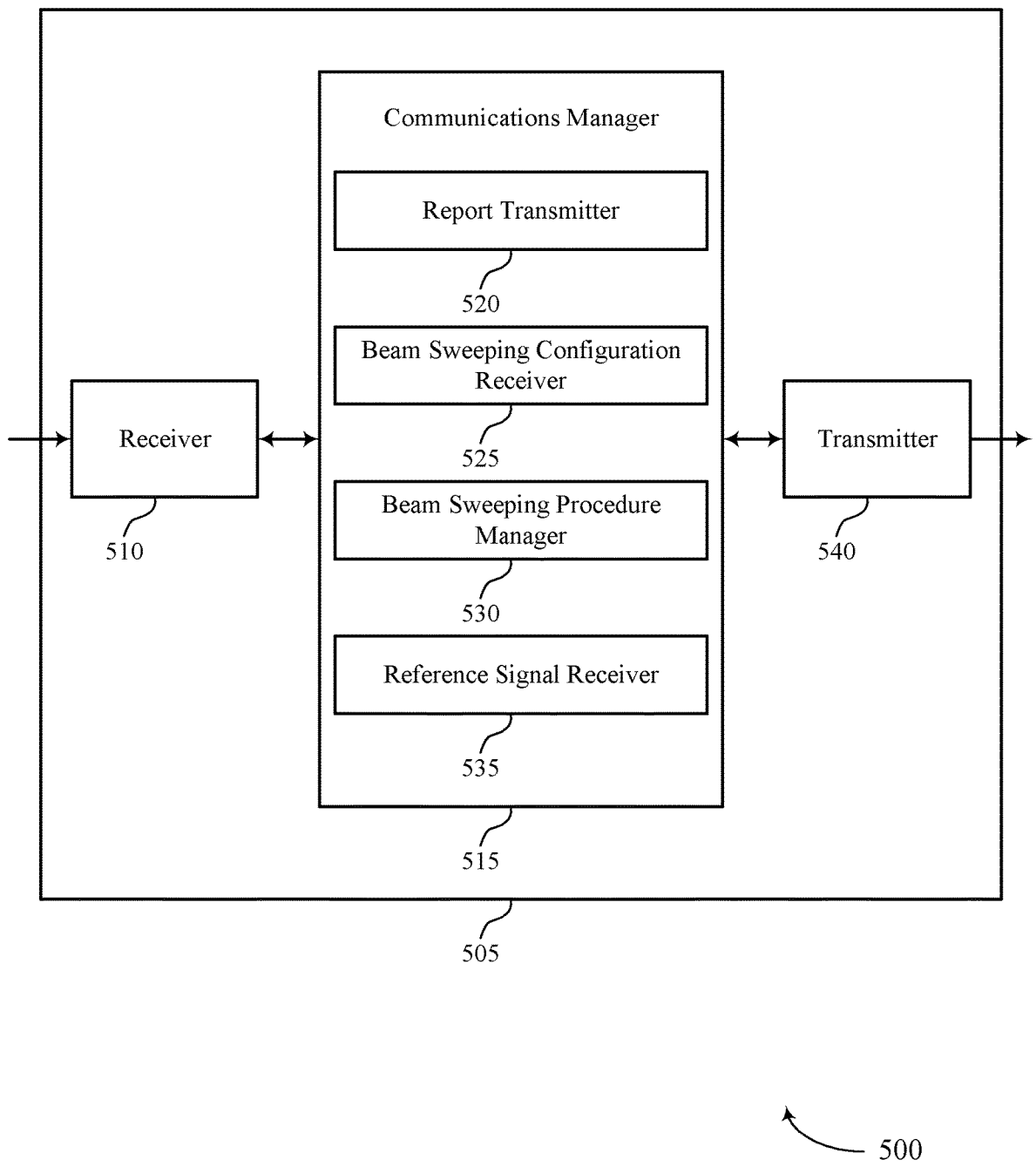

FIG. 5 shows a block diagram 500 of a device 505 that supports configurations for sidelink beam management in accordance with aspects of the present disclosure. The device 505 may be an example of aspects of a device 405, or a UE 115 as described herein. The device 505 may include a receiver 510, a communications manager 515, and a transmitter 540. The device 505 may also include a processor. Each of these components may be in communication with one another (e.g., via one or more buses).

The receiver 510 may receive information such as packets, user data, or control information associated with various information channels (e.g., control channels, data channels, and information related to configurations for sidelink beam management, etc.). Information may be passed on to other components of the device 505. The receiver 510 may be an example of aspects of the transceiver 720 described with reference to FIG. 7. The receiver 510 may utilize a single antenna or a set of antennas.

The communications manager 515 may be an example of aspects of the communications manager 415 as described herein. The communications manager 515 may include a report transmitter 520, a beam sweeping configuration receiver 525, a beam sweeping procedure manager 530, and a reference signal receiver 535. The communications manager 515 may be an example of aspects of the communications manager 710 described herein.

The report transmitter 520 may transmit, to a base station, a report that indicates beam sweeping capabilities of the first UE for a sidelink communications link between the first UE and a second UE.

The beam sweeping configuration receiver 525 may receive, from the base station, a beam sweeping configuration for the sidelink communications link based on the beam sweeping capabilities indicated by the first UE.

The beam sweeping procedure manager 530 may perform a beam sweeping procedure with the second UE based on the beam sweeping configuration.

The reference signal receiver 535 may receive, as part of a beam training procedure for a sidelink communications link, reference signals from a transmit UE via the sidelink communications link.

The report transmitter 520 may transmit, to a base station or the transmit UE, a measurement report of the beam sweeping procedure based on the reference signals, where the measurement report includes measurement information associated with the reference signals.

The transmitter 540 may transmit signals generated by other components of the device 505. In some examples, the transmitter 540 may be collocated with a receiver 510 in a transceiver module. For example, the transmitter 540 may be an example of aspects of the transceiver 720 described with reference to FIG. 7. The transmitter 540 may utilize a single antenna or a set of antennas.

In some examples, the communications manager 515 may be implemented as an integrated circuit or chipset for a mobile device modem, and the receiver 510 and transmitter 540 may be implemented as analog components (e.g., amplifiers, filters, antennas) coupled with the mobile device modem to enable wireless transmission and reception over one or more bands.

The communications manager 515 as described herein may be implemented to realize one or more potential advantages. One implementation may allow the device 505 to receive a beam sweeping configuration for a sidelink communications link with another device. The device 505 may perform a beam sweeping procedure with the other device based on the beam sweeping configuration. This beam sweeping procedure may increase reliability and reduce latency during sidelink communications.

Based on techniques for implementing sidelink beam management as described herein, a processor of a UE 115 (e.g., controlling the receiver 510, the transmitter 540, or the transceiver 720 as described with reference to FIG. 7) may increase reliability and decrease signaling overhead in sidelink communications.

Figure 6:
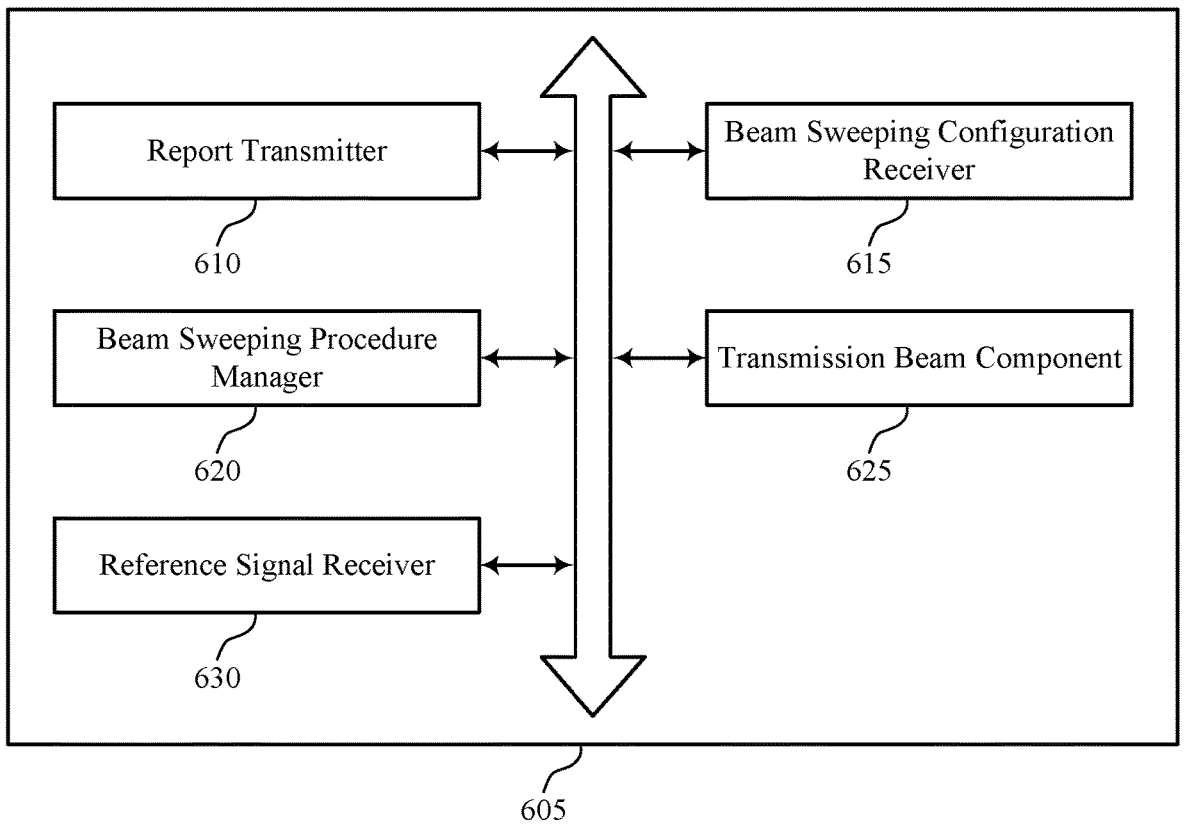
FIG. 6 shows a block diagram of a communications manager that supports configurations for sidelink beam management in accordance with aspects of the present disclosure.

FIG. 6 shows a block diagram 600 of a communications manager 605 that supports configurations for sidelink beam management in accordance with aspects of the present disclosure. The communications manager 605 may be an example of aspects of a communications manager 415, a communications manager 515, or a communications manager 710 described herein. The communications manager 605 may include a report transmitter 610, a beam sweeping configuration receiver 615, a beam sweeping procedure manager 620, a transmission beam component 625, and a reference signal receiver 630. Each of these modules may communicate, directly or indirectly, with one another (e.g., via one or more buses).

The report transmitter 610 may transmit, to a base station, a report that indicates beam sweeping capabilities of the first UE for a sidelink communications link between the first UE and a second UE. In some examples, the report transmitter 610 may transmit, to a base station or the transmit UE, a measurement report of the beam sweeping procedure based on the reference signals, where the measurement report includes measurement information associated with the reference signals.

In some examples, the report transmitter 610 may transmit a number of antenna panels of the first UE. In some examples, the report transmitter 610 may transmit a number of antenna elements per antenna panel of the first UE. In some examples, the report transmitter 610 may transmit an element type associated with one or more antenna elements of the first UE. In some examples, the report transmitter 610 may transmit a relative orientation of multiple antenna panels of the first UE.

In some examples, the report transmitter 610 may transmit form factor information of the first UE, where the form factor information includes an indication of a change in form factor of the first UE, a change in relative location of one or more antenna panels based on the form factor of the first UE, a current form factor of the first UE, one or more external attachments of the first UE, or any combination thereof.

In some examples, the report transmitter 610 may transmit a UE capability of the first UE, where the UE capability includes an indication of support for slot-based reception, symbol-based reception, slot-based transmission, symbol-based transmission, a number of beam-switches per slot, or any combination thereof. In some examples, the report transmitter 610 may transmit a measurement report of the beam sweeping procedure to the base station.

In some cases, the measurement report includes one or more reference signals communicated over the sidelink communications link and associated reception beams for each of the one or more reference signals.

The beam sweeping configuration receiver 615 may receive, from the base station, a beam sweeping configuration for the sidelink communications link based on the beam sweeping capabilities indicated by the first UE. In some examples, the beam sweeping configuration receiver 615 may receive the beam sweeping configuration via DCI, RRC signaling, or a MAC-CE. In some examples, the beam sweeping configuration receiver 615 may receive an indication of a set of transmission beams of the first UE to be used for the beam sweeping procedure.

In some examples, the report transmitter 610 may transmit a measurement report of the beam sweeping procedure based on the reference signals, where the measurement report includes measurement information associated with the reference signals.

In some examples, the beam sweeping configuration receiver 615 may receive an indication of one or more next transmission beams from the base station in response to the measurement report, the one or more next transmission beams for subsequent use in the beam sweeping procedure.

In some examples, the beam sweeping configuration receiver 615 may receive the beam sweeping configuration in response to the indication, the beam sweeping configuration including time-frequency resources for the set of transmission beams for the beam sweeping procedure.

In some examples, the beam sweeping configuration receiver 615 may receive the beam sweeping configuration in response to the request, the beam sweeping configuration including a second number of transmission beams for the beam sweeping procedure. In some cases, the first number is the same as the second number. In some cases, the first number is based on a number of beam switches the first UE is capable of performing within a transmission time interval.

The beam sweeping procedure manager 620 may perform a beam sweeping procedure with the second UE based on the beam sweeping configuration. In some examples, the beam sweeping procedure manager 620 may transmit reference signals to the second UE via the set of transmission beams. In some examples, the beam sweeping procedure manager 620 may perform a second beam sweeping procedure using the transmission beam based on the indication.

In some examples, the beam sweeping procedure manager 620 may perform the beam sweeping procedure using the first and second subsets of transmission beams. In some cases, the beam sweeping configuration indicates time-frequency resources for a set of transmission beams of the first UE for the beam sweeping procedure. In some cases, the beam sweeping procedure is performed using the indicated time-frequency resources.

The reference signal receiver 630 may receive, as part of a beam training procedure for a sidelink communications link, reference signals from a transmit UE via the sidelink communications link.

The transmission beam component 625 may receive an indication of a transmission beam based on the measurement report. In some examples, the transmission beam component 625 may determine a set of transmission beams of the first UE for the beam sweeping procedure. In some examples, the transmission beam component 625 may transmit, to the base station, an indication of the set of transmission beams. In some examples, the transmission beam component 625 may transmit, to the base station, a request to use a first number of transmission beams in the beam sweeping procedure.

In some examples, the transmission beam component 625 may determine a requested beam sweeping pattern including transmission beam repetition for beam sweeping at the second UE for the set of transmission beams. In some examples, the transmission beam component 625 may transmit, to the base station, the requested beam sweeping pattern for performing the beam sweeping procedure.

In some examples, the transmission beam component 625 may receive the beam sweeping configuration in response to a requested beam sweeping pattern, the beam sweeping configuration including time-frequency resources for the set of transmission beams for the beam sweeping procedure in accordance with the beam sweeping pattern.

In some examples, the transmission beam component 625 may receive an indication of a first subset of transmission beams of the first UE to be used for the beam sweeping procedure. In some examples, the transmission beam component 625 may select a second subset of transmission beams of the first UE to be used for the beam sweeping procedure.

Figure 7:
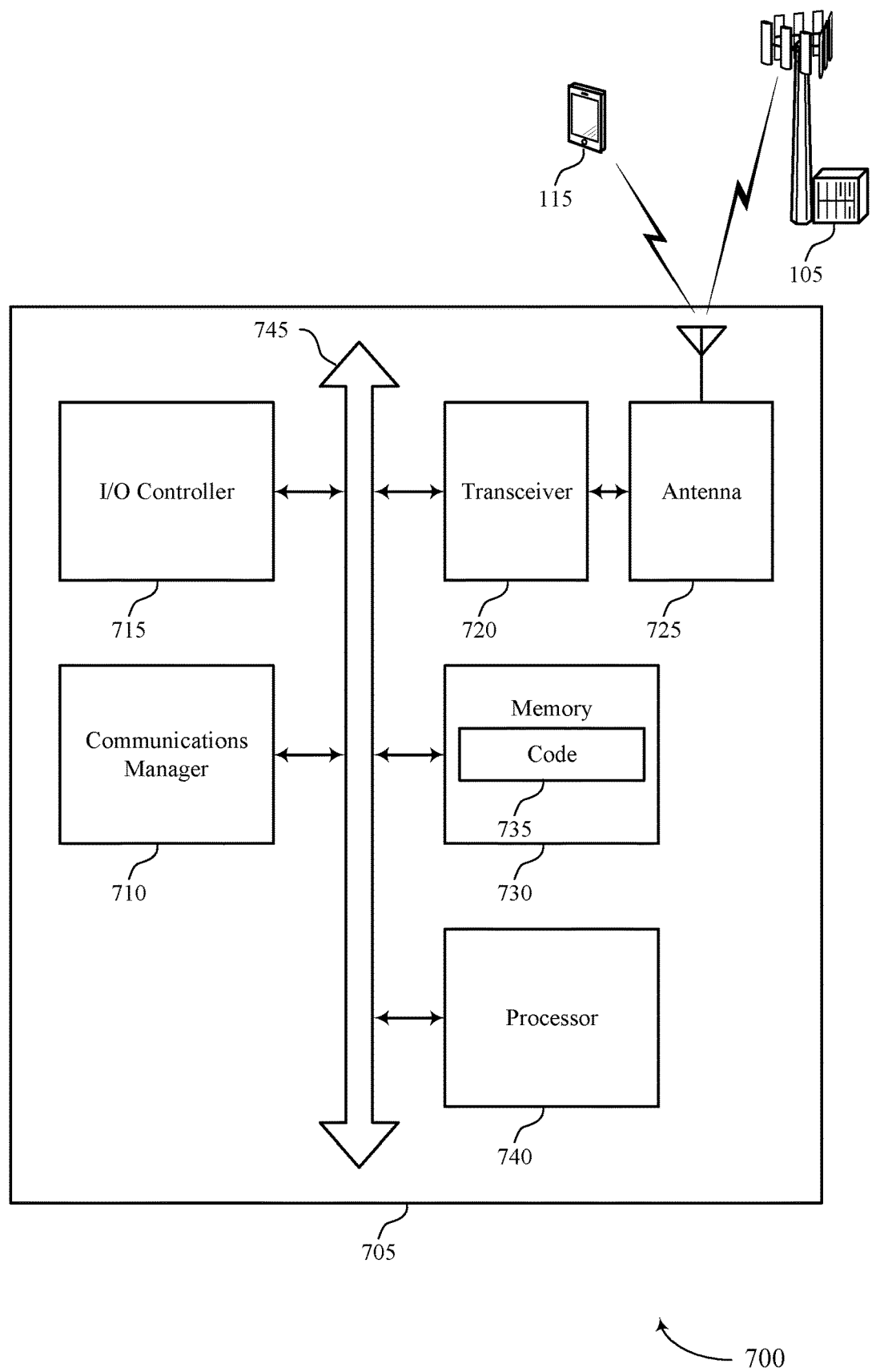
FIG. 7 shows a diagram of a system including a device that supports configurations for sidelink beam management in accordance with aspects of the present disclosure.

FIG. 7 shows a diagram of a system 700 including a device 705 that supports configurations for sidelink beam management in accordance with aspects of the present disclosure. The device 705 may be an example of or include the components of device 405, device 505, or a UE 115 as described herein. The device 705 may include components for bi-directional voice and data communications including components for transmitting and receiving communications, including a communications manager 710, an I/O controller 715, a transceiver 720, an antenna 725, memory 730, and a processor 740. These components may be in electronic communication via one or more buses (e.g., bus 745).

The communications manager 710 may transmit, to a base station, a report that indicates beam sweeping capabilities of the first UE for a sidelink communications link between the first UE and a second UE, receive, from the base station, a beam sweeping configuration for the sidelink communications link based on the beam sweeping capabilities indicated by the first UE, and perform a beam sweeping procedure with the second UE based on the beam sweeping configuration. The communications manager 710 may also receive, as part of a beam training procedure for a sidelink communications link, reference signals from a transmit UE via the sidelink communications link and transmit, to a base station or the transmit UE, a measurement report of the beam sweeping procedure based on the reference signals, where the measurement report includes measurement information associated with the reference signals.

The I/O controller 715 may manage input and output signals for the device 705. The I/O controller 715 may also manage peripherals not integrated into the device 705. In some cases, the I/O controller 715 may represent a physical connection or port to an external peripheral. In some cases, the I/O controller 715 may utilize an operating system such as iOS®, ANDROID®, MS-DOS®, MS-WINDOWS®, OS/2®, UNIX®, LINUX®, or another known operating system. In other cases, the I/O controller 715 may represent or interact with a modem, a keyboard, a mouse, a touchscreen, or a similar device. In some cases, the I/O controller 715 may be implemented as part of a processor. In some cases, a user may interact with the device 705 via the I/O controller 715 or via hardware components controlled by the I/O controller 715.

The transceiver 720 may communicate bi-directionally, via one or more antennas, wired, or wireless links as described above. For example, the transceiver 720 may represent a wireless transceiver and may communicate bi-directionally with another wireless transceiver. The transceiver 720 may also include a modem to modulate the packets and provide the modulated packets to the antennas for transmission, and to demodulate packets received from the antennas.

In some cases, the wireless device may include a single antenna 725. However, in some cases the device may have more than one antenna 725, which may be capable of concurrently transmitting or receiving multiple wireless transmissions.

The memory 730 may include random access memory (RAM) and read only memory (ROM). The memory 730 may store computer-readable, computer-executable code 735 including instructions that, when executed, cause the processor to perform various functions described herein. In some cases, the memory 730 may contain, among other things, a BIOS which may control basic hardware or software operation such as the interaction with peripheral components or devices.

The processor 740 may include an intelligent hardware device (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 740 may be configured to operate a memory array using a memory controller. In other cases, a memory controller may be integrated into the processor 740. The processor 740 may be configured to execute computer-readable instructions stored in a memory (e.g., the memory 730) to cause the device 705 to perform various functions (e.g., functions or tasks supporting configurations for sidelink beam management).

The code 735 may include instructions to implement aspects of the present disclosure, including instructions to support wireless communications. The code 735 may be stored in a non-transitory computer-readable medium such as system memory or other type of memory. In some cases, the code 735 may not be directly executable by the processor 740 but may cause a computer (e.g., when compiled and executed) to perform functions described herein.

Figure 8:
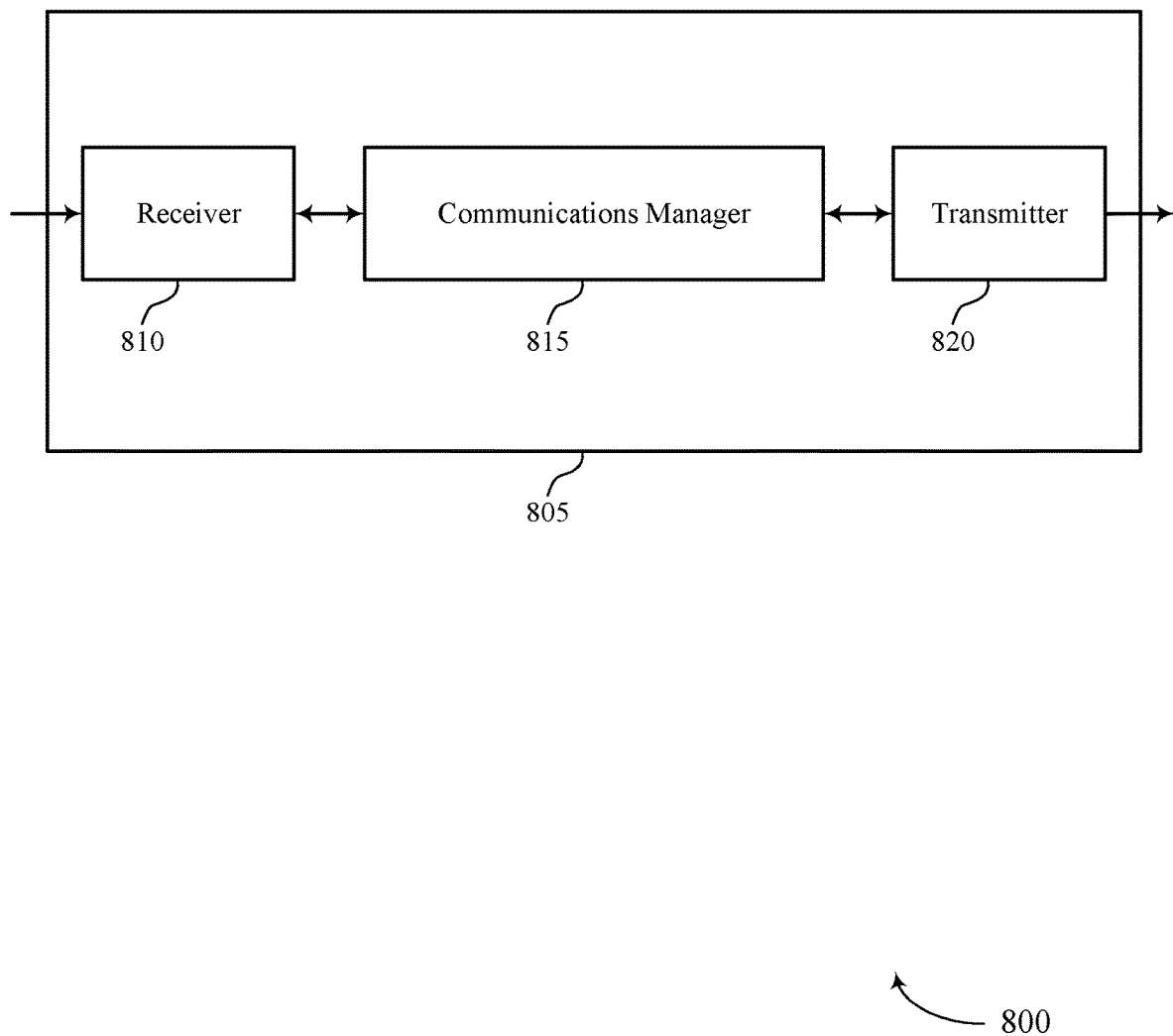
FIGS. 8 and 9 show block diagrams of devices that support configurations for sidelink beam management in accordance with aspects of the present disclosure.

FIG. 8 shows a block diagram 800 of a device 805 that supports configurations for sidelink beam management in accordance with aspects of the present disclosure. The device 805 may be an example of aspects of a base station 105 as described herein. The device 805 may include a receiver 810, a communications manager 815, and a transmitter 820. The device 805 may also include a processor. Each of these components may be in communication with one another (e.g., via one or more buses).

The receiver 810 may receive information such as packets, user data, or control information associated with various information channels (e.g., control channels, data channels, and information related to configurations for sidelink beam management, etc.). Information may be passed on to other components of the device 805. The receiver 810 may be an example of aspects of the transceiver 1120 described with reference to FIG. 11. The receiver 810 may utilize a single antenna or a set of antennas.

The communications manager 815 may receive, from a first UE, a report that indicates beam sweeping capabilities of the first UE for a sidelink communications link between the first UE and a second UE, determine a beam sweeping configuration for the sidelink communications link based on the beam sweeping capabilities indicated by the first UE, and transmit, to the first UE, the beam sweeping configuration for a beam sweeping procedure between the first UE and the second UE. The communications manager 815 may be an example of aspects of the communications manager 1110 described herein.

The communications manager 815, or its sub-components, may be implemented in hardware, code (e.g., software or firmware) executed by a processor, or any combination thereof. If implemented in code executed by a processor, the functions of the communications manager 815, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The communications manager 815, or its sub-components, may be physically located at various positions, including being distributed such that portions of functions are implemented at different physical locations by one or more physical components. In some examples, the communications manager 815, or its sub-components, may be a separate and distinct component in accordance with various aspects of the present disclosure. In some examples, the communications manager 815, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 820 may transmit signals generated by other components of the device 805. In some examples, the transmitter 820 may be collocated with a receiver 810 in a transceiver module. For example, the transmitter 820 may be an example of aspects of the transceiver 1120 described with reference to FIG. 11. The transmitter 820 may utilize a single antenna or a set of antennas.

Figure 9:
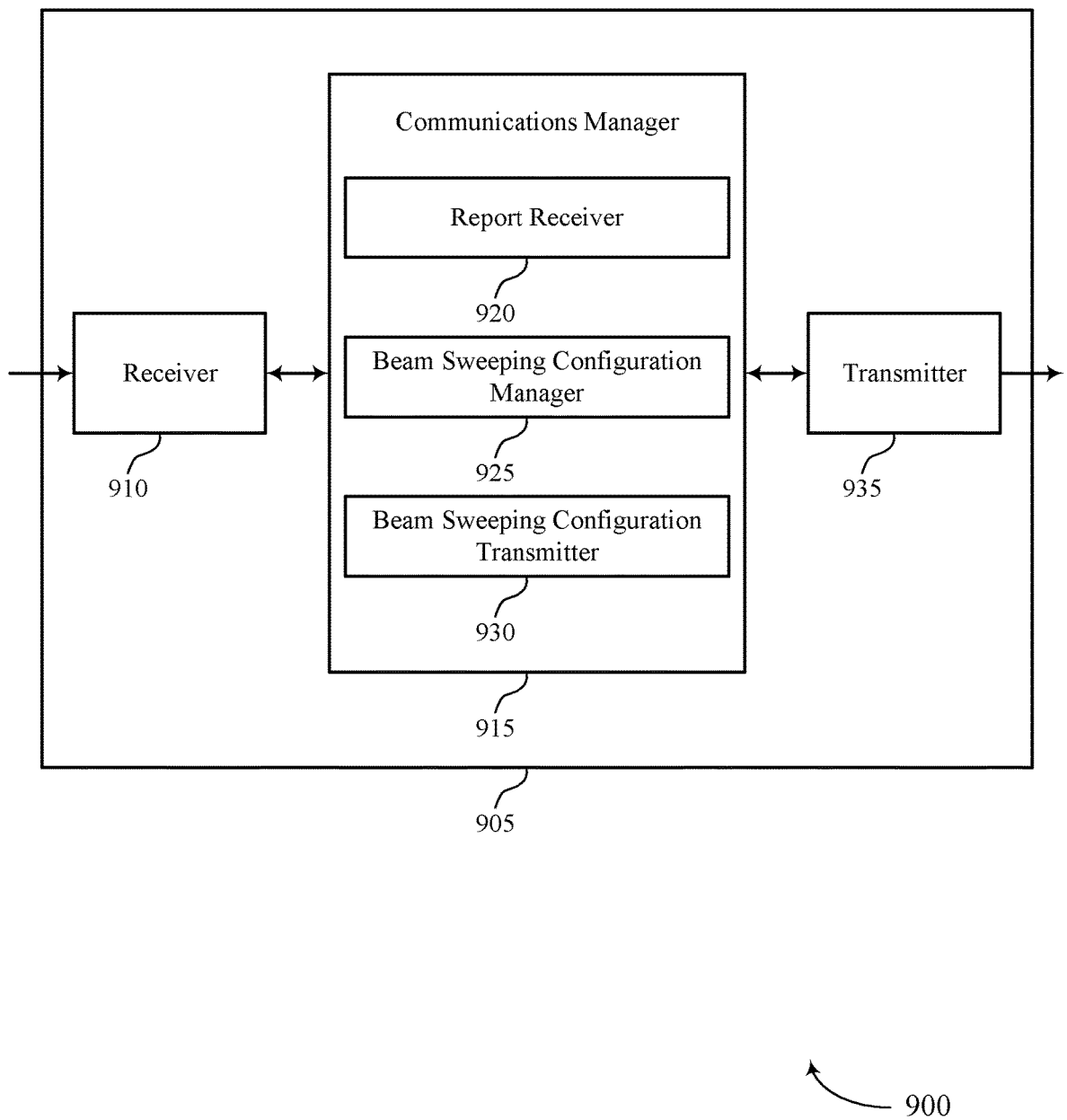

FIG. 9 shows a block diagram 900 of a device 905 that supports configurations for sidelink beam management in accordance with aspects of the present disclosure. The device 905 may be an example of aspects of a device 805, or a base station 105 as described herein. The device 905 may include a receiver 910, a communications manager 915, and a transmitter 935. The device 905 may also include a processor. Each of these components may be in communication with one another (e.g., via one or more buses).

The receiver 910 may receive information such as packets, user data, or control information associated with various information channels (e.g., control channels, data channels, and information related to configurations for sidelink beam management, etc.). Information may be passed on to other components of the device 905. The receiver 910 may be an example of aspects of the transceiver 1120 described with reference to FIG. 11. The receiver 910 may utilize a single antenna or a set of antennas.

The communications manager 915 may be an example of aspects of the communications manager 815 as described herein. The communications manager 915 may include a report receiver 920, a beam sweeping configuration manager 925, and a beam sweeping configuration transmitter 930. The communications manager 915 may be an example of aspects of the communications manager 1110 described herein.

The report receiver 920 may receive, from a first UE, a report that indicates beam sweeping capabilities of the first UE for a sidelink communications link between the first UE and a second UE.

The beam sweeping configuration manager 925 may determine a beam sweeping configuration for the sidelink communications link based on the beam sweeping capabilities indicated by the first UE.

The beam sweeping configuration transmitter 930 may transmit, to the first UE, the beam sweeping configuration for a beam sweeping procedure between the first UE and the second UE.

The transmitter 935 may transmit signals generated by other components of the device 905. In some examples, the transmitter 935 may be collocated with a receiver 910 in a transceiver module. For example, the transmitter 935 may be an example of aspects of the transceiver 1120 described with reference to FIG. 11. The transmitter 935 may utilize a single antenna or a set of antennas.

Figure 10:
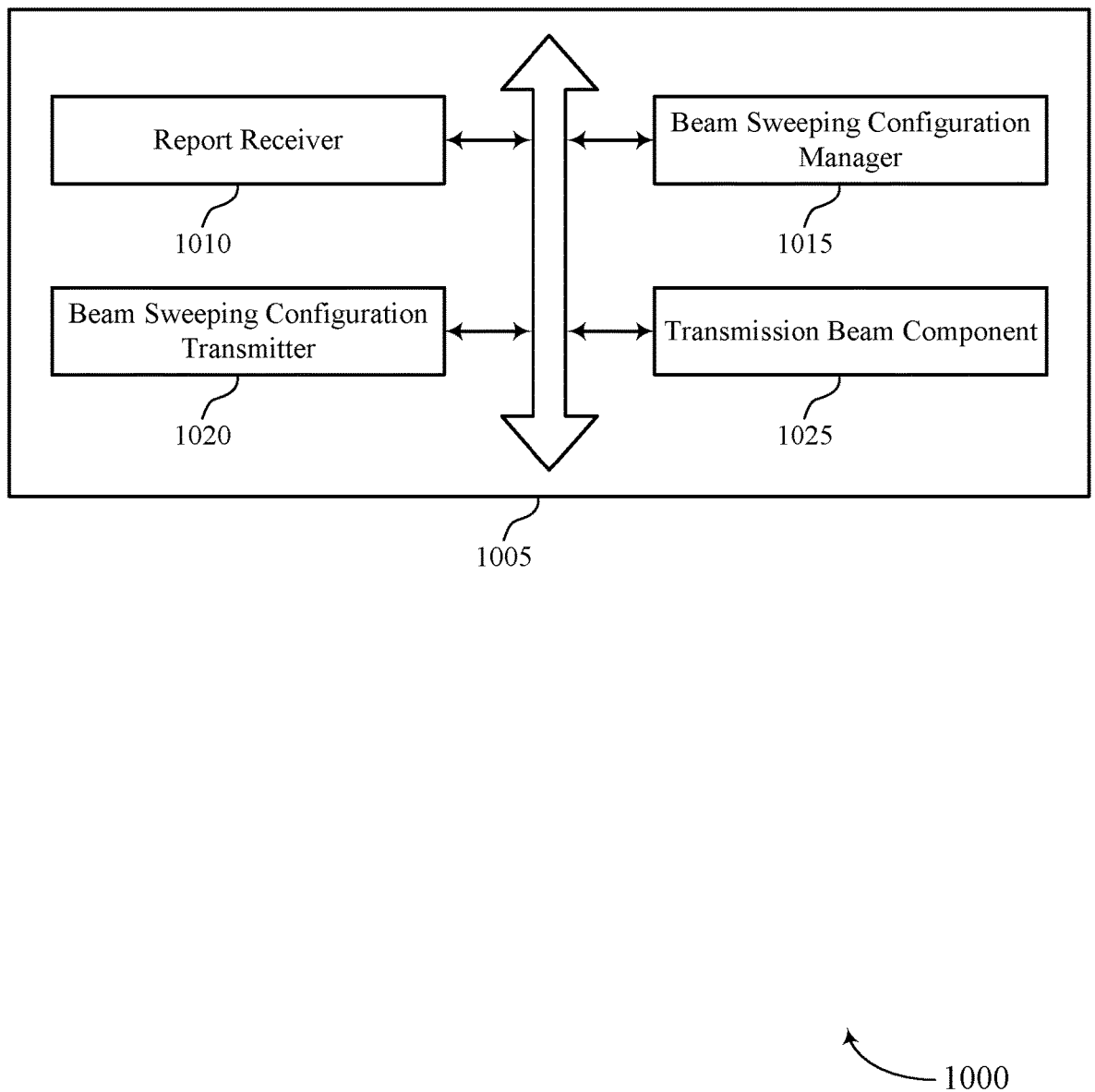
FIG. 10 shows a block diagram of a communications manager that supports configurations for sidelink beam management in accordance with aspects of the present disclosure.

FIG. 10 shows a block diagram 1000 of a communications manager 1005 that supports configurations for sidelink beam management in accordance with aspects of the present disclosure. The communications manager 1005 may be an example of aspects of a communications manager 815, a communications manager 915, or a communications manager 1110 described herein. The communications manager 1005 may include a report receiver 1010, a beam sweeping configuration manager 1015, a beam sweeping configuration transmitter 1020, and a transmission beam component 1025. Each of these modules may communicate, directly or indirectly, with one another (e.g., via one or more buses).

The report receiver 1010 may receive, from a first UE, a report that indicates beam sweeping capabilities of the first UE for a sidelink communications link between the first UE and a second UE. In some examples, the report receiver 1010 may receive a number of antenna panels of the first UE. In some examples, the report receiver 1010 may receive a number of antenna elements per antenna panel of the first UE. In some examples, the report receiver 1010 may receive an element type associated with one or more antenna elements of the first UE. In some examples, the report receiver 1010 may receive a relative orientation of multiple antenna panels of the first UE.

In some examples, the report receiver 1010 may receive form factor information of the first UE, where the form factor information includes an indication of a change in form factor of the first UE, a change in relative location of one or more antenna panels based on the form factor of the first UE, a current form factor of the first UE, one or more external attachments of the first UE, or any combination thereof.

In some examples, the report receiver 1010 may receive a UE capability of the first UE, where the UE capability includes an indication of support for slot-based reception, symbol-based reception, slot-based transmission, symbol-based transmission, a number of beam-switches per slot, or any combination thereof. In some examples, the report receiver 1010 may receive a measurement report of the beam sweeping procedure from the first UE or the second UE.

The beam sweeping configuration manager 1015 may determine a beam sweeping configuration for the sidelink communications link based on the beam sweeping capabilities indicated by the first UE. In some examples, the beam sweeping configuration manager 1015 may transmit the beam sweeping configuration via DCI, RRC signaling, or a MAC-CE.

In some examples, the beam sweeping configuration manager 1015 may transmit an indication of a set of transmission beams of the first UE to be used for the beam sweeping procedure.

In some examples, the report receiver 1010 may receive a measurement report of the beam sweeping procedure based on the indication, where the measurement report includes measurement information associated with one or more reference signals as part of the beam sweeping procedure.

In some examples, the beam sweeping configuration manager 1015 may transmit a next transmission beam to the first UE in response to the measurement report, the next transmission beam for subsequent use in the beam sweeping procedure. In some examples, the beam sweeping configuration manager 1015 may transmit the beam sweeping configuration for the set of transmission beams for the beam sweeping procedure in the beam sweeping configuration.

In some examples, the beam sweeping configuration manager 1015 may receive, from the first UE, a request to use a first number of transmission beams for the beam sweeping procedure. In some examples, the beam sweeping configuration manager 1015 may transmit a second number of transmission beams for the beam sweeping procedure in the beam sweeping configuration based on the request. In some cases, the beam sweeping configuration indicates time-frequency resources for the set of transmission beams of the first UE for the beam sweeping procedure. In some cases, the first number is the same as the second number. In some cases, the first number is based on a number of beam switches the first UE is capable of performing within a transmission time interval.

The beam sweeping configuration transmitter 1020 may transmit, to the first UE, the beam sweeping configuration for a beam sweeping procedure between the first UE and the second UE.

The transmission beam component 1025 may transmit an indication of a transmission beam for a second beam sweeping procedure based on the measurement report.

In some examples, the transmission beam component 1025 may receive, from the first UE, an indication of a set of transmission beams of the first UE for the beam sweeping procedure.

In some examples, the transmission beam component 1025 may receive, from the first UE, a requested beam sweeping pattern for performing the beam sweeping procedure, the requested beam sweeping pattern including transmission beam repetition for beam sweeping at the second UE.

In some examples, the transmission beam component 1025 may transmit the beam sweeping configuration in response to the control message. In some cases, the beam sweeping configuration includes time-frequency resources for the requested beam sweeping pattern for the beam sweeping procedure.

Figure 11:
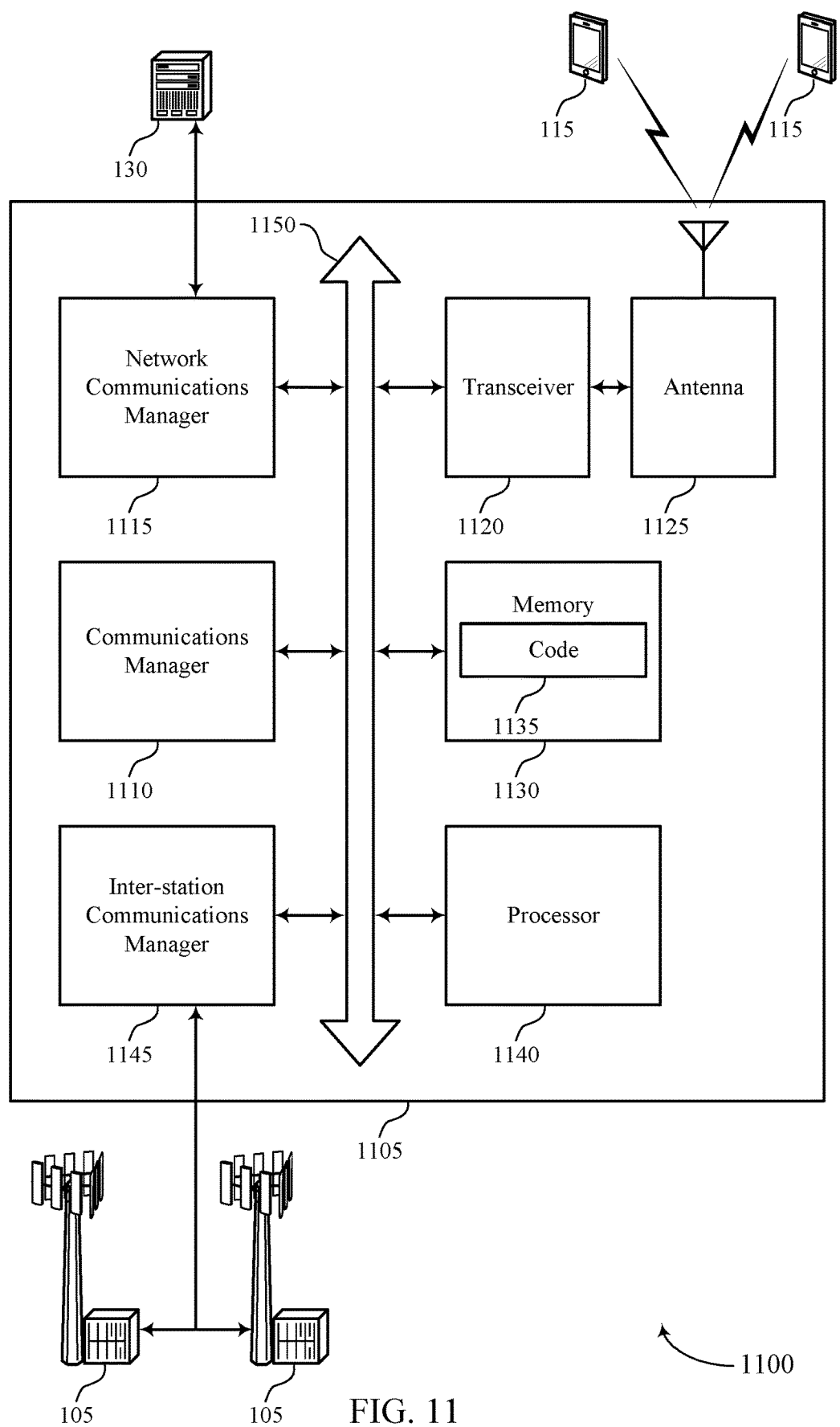
FIG. 11 shows a diagram of a system including a device that supports configurations for sidelink beam management in accordance with aspects of the present disclosure.

FIG. 11 shows a diagram of a system 1100 including a device 1105 that supports configurations for sidelink beam management in accordance with aspects of the present disclosure. The device 1105 may be an example of or include the components of device 805, device 905, or a base station 105 as described herein. The device 1105 may include components for bi-directional voice and data communications including components for transmitting and receiving communications, including a communications manager 1110, a network communications manager 1115, a transceiver 1120, an antenna 1125, memory 1130, a processor 1140, and an inter-station communications manager 1145. These components may be in electronic communication via one or more buses (e.g., bus 1150).

The communications manager 1110 may receive, from a first UE, a report that indicates beam sweeping capabilities of the first UE for a sidelink communications link between the first UE and a second UE, determine a beam sweeping configuration for the sidelink communications link based on the beam sweeping capabilities indicated by the first UE, and transmit, to the first UE, the beam sweeping configuration for a beam sweeping procedure between the first UE and the second UE.

The network communications manager 1115 may manage communications with the core network (e.g., via one or more wired backhaul links). For example, the network communications manager 1115 may manage the transfer of data communications for client devices, such as one or more UEs 115.

The transceiver 1120 may communicate bi-directionally, via one or more antennas, wired, or wireless links as described above. For example, the transceiver 1120 may represent a wireless transceiver and may communicate bi-directionally with another wireless transceiver. The transceiver 1120 may also include a modem to modulate the packets and provide the modulated packets to the antennas for transmission, and to demodulate packets received from the antennas.

In some cases, the wireless device may include a single antenna 1125. However, in some cases the device may have more than one antenna 1125, which may be capable of concurrently transmitting or receiving multiple wireless transmissions.

The memory 1130 may include RAM, ROM, or a combination thereof. The memory 1130 may store computer-readable code 1135 including instructions that, when executed by a processor (e.g., the processor 1140) cause the device to perform various functions described herein. In some cases, the memory 1130 may contain, among other things, a BIOS which may control basic hardware or software operation such as the interaction with peripheral components or devices.

The processor 1140 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some cases, a memory controller may be integrated into processor 1140. The processor 1140 may be configured to execute computer-readable instructions stored in a memory (e.g., the memory 1130) to cause the device 1105 to perform various functions (e.g., functions or tasks supporting configurations for sidelink beam management).

The inter-station communications manager 1145 may manage communications with other base station 105, and may include a controller or scheduler for controlling communications with UEs 115 in cooperation with other base stations 105. For example, the inter-station communications manager 1145 may coordinate scheduling for transmissions to UEs 115 for various interference mitigation techniques such as beamforming or joint transmission. In some examples, the inter-station communications manager 1145 may provide an X2 interface within an LTE/LTE-A wireless communication network technology to provide communication between base stations 105.

The code 1135 may include instructions to implement aspects of the present disclosure, including instructions to support wireless communications. The code 1135 may be stored in a non-transitory computer-readable medium such as system memory or other type of memory. In some cases, the code 1135 may not be directly executable by the processor 1140 but may cause a computer (e.g., when compiled and executed) to perform functions described herein.

Figure 12:
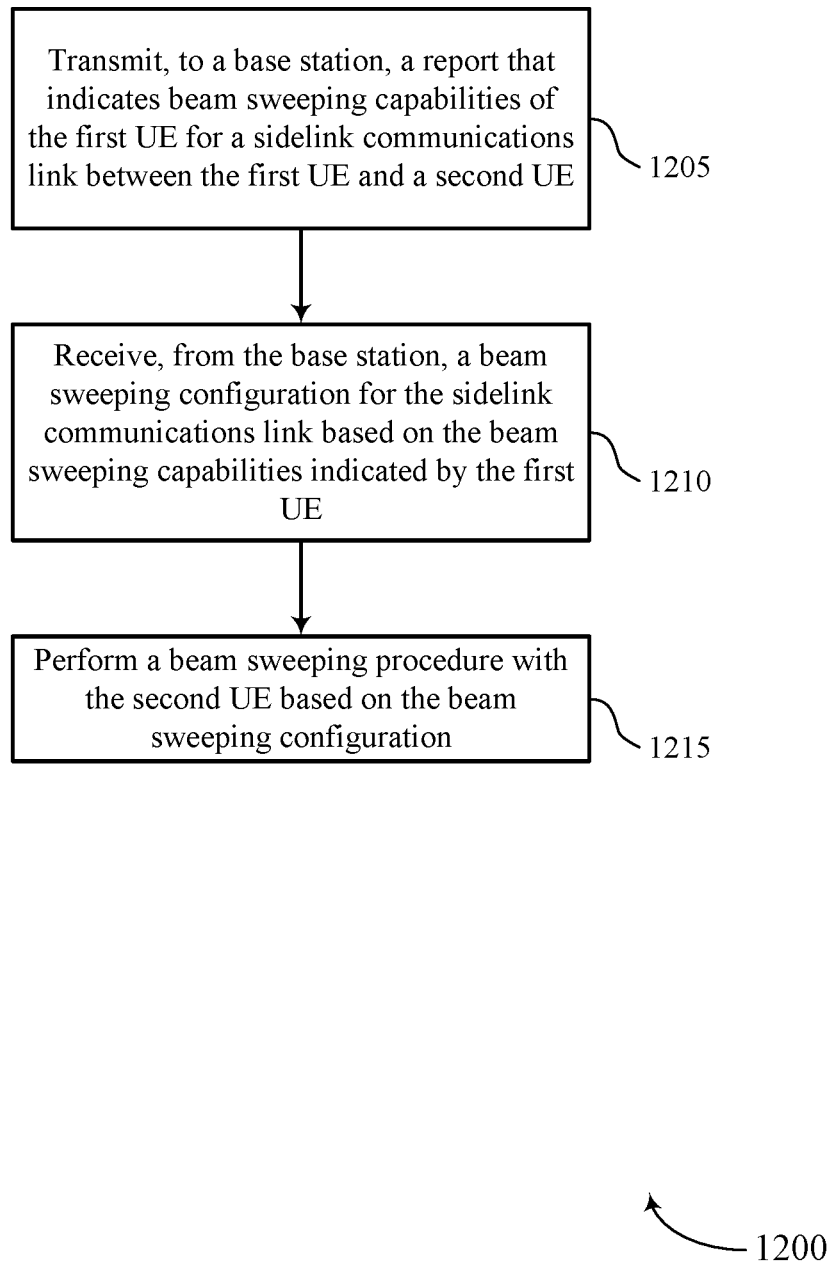
FIGS. 12 through 16 show flowcharts illustrating methods that support configurations for sidelink beam management in accordance with aspects of the present disclosure.

FIG. 12 shows a flowchart illustrating a method 1200 that supports configurations for sidelink beam management in accordance with aspects of the present disclosure. The operations of method 1200 may be implemented by a UE 115 or its components as described herein. For example, the operations of method 1200 may be performed by a communications manager as described with reference to FIGS. 4 through 7. In some examples, a UE may execute a set of instructions to control the functional elements of the UE to perform the functions described below. Additionally or alternatively, a UE may perform aspects of the functions described below using special-purpose hardware.

At 1205, the UE may transmit, to a base station, a report that indicates beam sweeping capabilities of the first UE for a sidelink communications link between the first UE and a second UE. The operations of 1205 may be performed according to the methods described herein. In some examples, aspects of the operations of 1205 may be performed by a report transmitter as described with reference to FIGS. 4 through 7.

At 1210, the UE may receive, from the base station, a beam sweeping configuration for the sidelink communications link based on the beam sweeping capabilities indicated by the first UE. The operations of 1210 may be performed according to the methods described herein. In some examples, aspects of the operations of 1210 may be performed by a beam sweeping configuration receiver as described with reference to FIGS. 4 through 7.

At 1215, the UE may perform a beam sweeping procedure with the second UE based on the beam sweeping configuration. The operations of 1215 may be performed according to the methods described herein. In some examples, aspects of the operations of 1215 may be performed by a beam sweeping procedure manager as described with reference to FIGS. 4 through 7.

Figure 13:
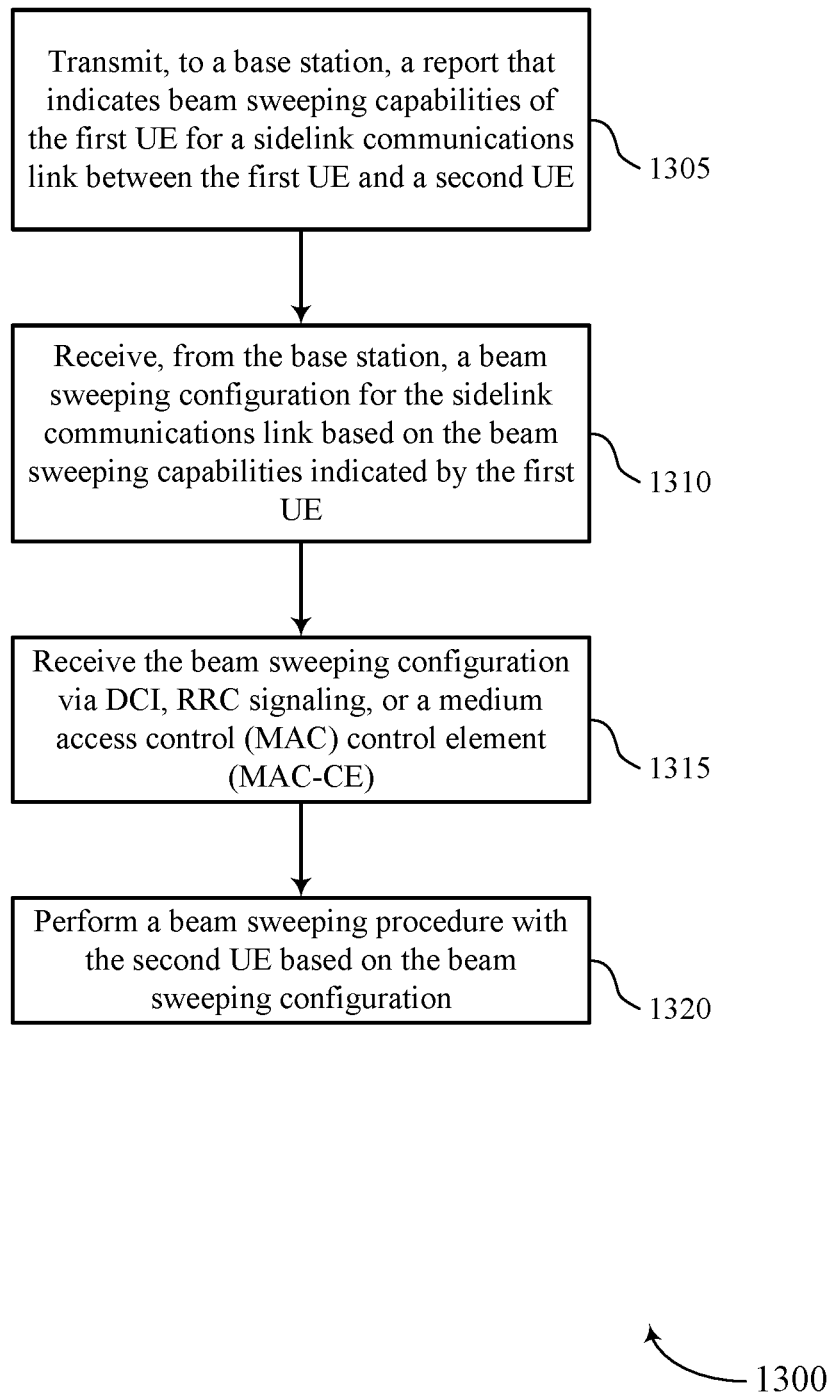

FIG. 13 shows a flowchart illustrating a method 1300 that supports configurations for sidelink beam management in accordance with aspects of the present disclosure. The operations of method 1300 may be implemented by a UE 115 or its components as described herein. For example, the operations of method 1300 may be performed by a communications manager as described with reference to FIGS. 4 through 7. In some examples, a UE may execute a set of instructions to control the functional elements of the UE to perform the functions described below. Additionally or alternatively, a UE may perform aspects of the functions described below using special-purpose hardware.

At 1305, the UE may transmit, to a base station, a report that indicates beam sweeping capabilities of the first UE for a sidelink communications link between the first UE and a second UE. The operations of 1305 may be performed according to the methods described herein. In some examples, aspects of the operations of 1305 may be performed by a report transmitter as described with reference to FIGS. 4 through 7.

At 1310, the UE may receive, from the base station, a beam sweeping configuration for the sidelink communications link based on the beam sweeping capabilities indicated by the first UE. The operations of 1310 may be performed according to the methods described herein. In some examples, aspects of the operations of 1310 may be performed by a beam sweeping configuration receiver as described with reference to FIGS. 4 through 7.

At 1315, the UE may receive the beam sweeping configuration via DCI, RRC signaling, or a MAC-CE). The operations of 1315 may be performed according to the methods described herein. In some examples, aspects of the operations of 1315 may be performed by a beam sweeping configuration receiver as described with reference to FIGS. 4 through 7.

At 1320, the UE may perform a beam sweeping procedure with the second UE based on the beam sweeping configuration. The operations of 1320 may be performed according to the methods described herein. In some examples, aspects of the operations of 1320 may be performed by a beam sweeping procedure manager as described with reference to FIGS. 4 through 7.

Figure 14:
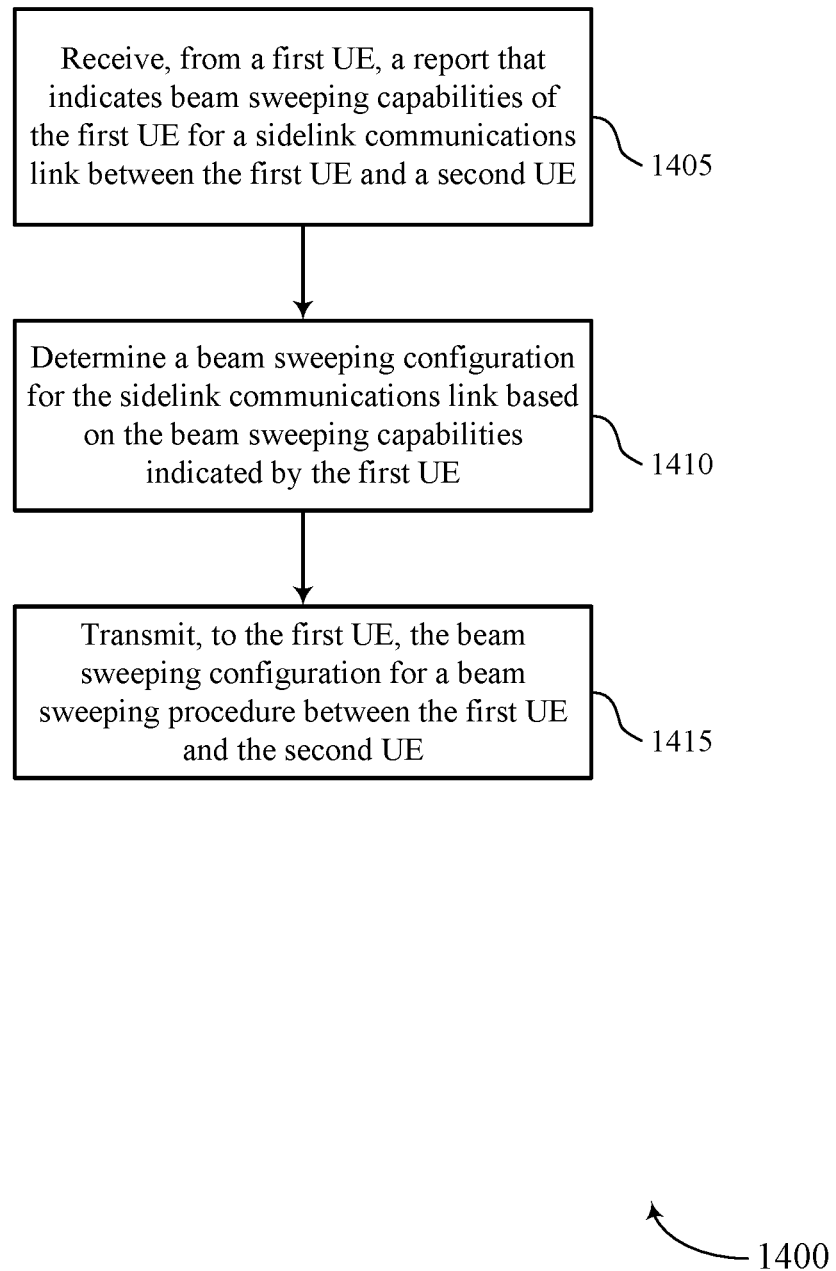

FIG. 14 shows a flowchart illustrating a method 1400 that supports configurations for sidelink beam management in accordance with aspects of the present disclosure. The operations of method 1400 may be implemented by a base station 105 or its components as described herein. For example, the operations of method 1400 may be performed by a communications manager as described with reference to FIGS. 8 through 11. In some examples, a base station may execute a set of instructions to control the functional elements of the base station to perform the functions described below. Additionally or alternatively, a base station may perform aspects of the functions described below using special-purpose hardware.

At 1405, the base station may receive, from a first UE, a report that indicates beam sweeping capabilities of the first UE for a sidelink communications link between the first UE and a second UE. The operations of 1405 may be performed according to the methods described herein. In some examples, aspects of the operations of 1405 may be performed by a report receiver as described with reference to FIGS. 8 through 11.

At 1410, the base station may determine a beam sweeping configuration for the sidelink communications link based on the beam sweeping capabilities indicated by the first UE. The operations of 1410 may be performed according to the methods described herein. In some examples, aspects of the operations of 1410 may be performed by a beam sweeping configuration manager as described with reference to FIGS. 8 through 11.

At 1415, the base station may transmit, to the first UE, the beam sweeping configuration for a beam sweeping procedure between the first UE and the second UE. The operations of 1415 may be performed according to the methods described herein. In some examples, aspects of the operations of 1415 may be performed by a beam sweeping configuration transmitter as described with reference to FIGS. 8 through 11.

Figure 15:
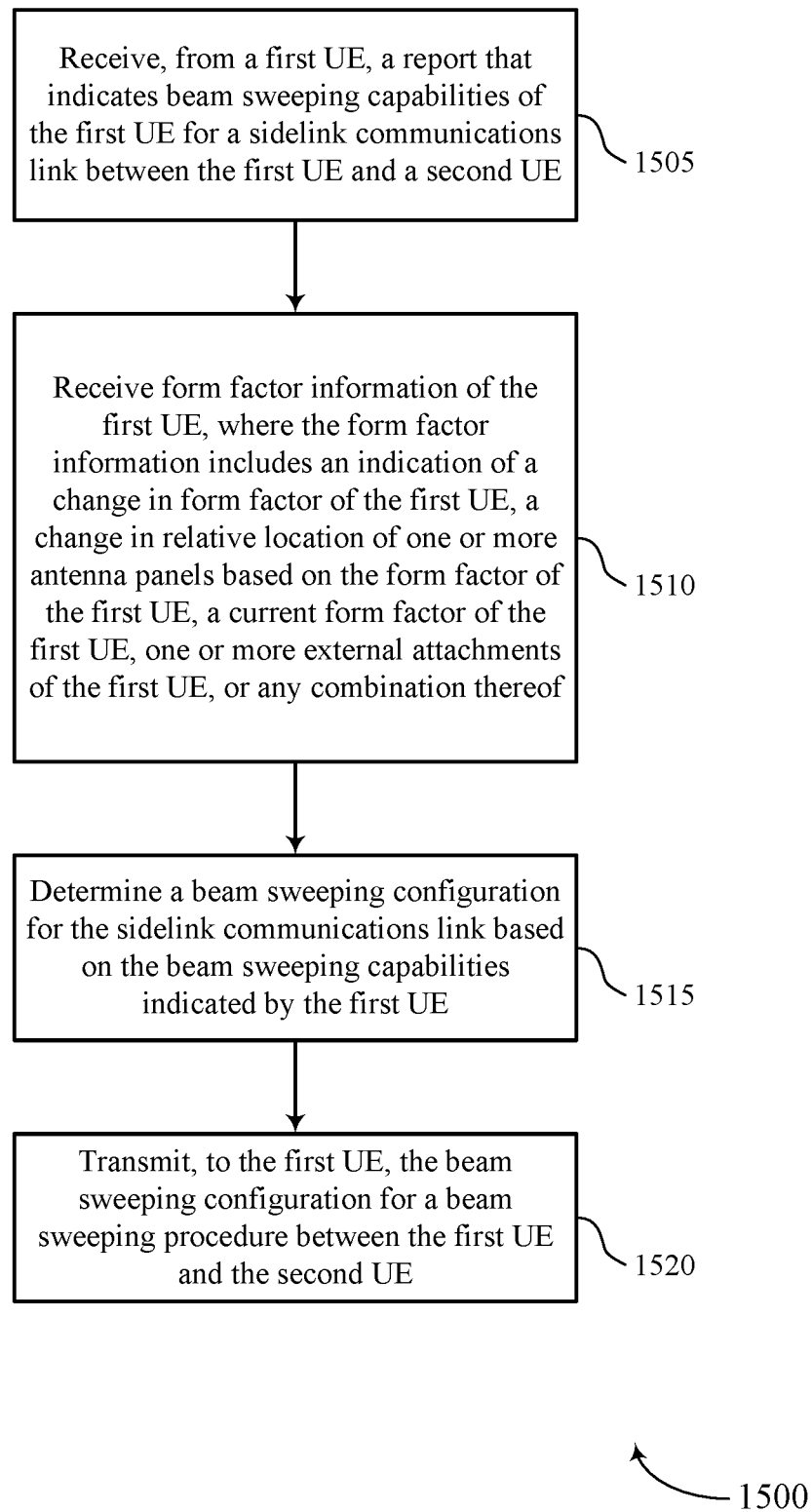

FIG. 15 shows a flowchart illustrating a method 1500 that supports configurations for sidelink beam management in accordance with aspects of the present disclosure. The operations of method 1500 may be implemented by a base station 105 or its components as described herein. For example, the operations of method 1500 may be performed by a communications manager as described with reference to FIGS. 8 through 11. In some examples, a base station may execute a set of instructions to control the functional elements of the base station to perform the functions described below. Additionally or alternatively, a base station may perform aspects of the functions described below using special-purpose hardware.

At 1505, the base station may receive, from a first UE, a report that indicates beam sweeping capabilities of the first UE for a sidelink communications link between the first UE and a second UE. The operations of 1505 may be performed according to the methods described herein. In some examples, aspects of the operations of 1505 may be performed by a report receiver as described with reference to FIGS. 8 through 11.

At 1510, the base station may receive form factor information of the first UE, where the form factor information includes an indication of a change in form factor of the first UE, a change in relative location of one or more antenna panels based on the form factor of the first UE, a current form factor of the first UE, one or more external attachments of the first UE, or any combination thereof. The operations of 1510 may be performed according to the methods described herein. In some examples, aspects of the operations of 1510 may be performed by a report receiver as described with reference to FIGS. 8 through 11.

At 1515, the base station may determine a beam sweeping configuration for the sidelink communications link based on the beam sweeping capabilities indicated by the first UE. The operations of 1515 may be performed according to the methods described herein. In some examples, aspects of the operations of 1515 may be performed by a beam sweeping configuration manager as described with reference to FIGS. 8 through 11.

At 1520, the base station may transmit, to the first UE, the beam sweeping configuration for a beam sweeping procedure between the first UE and the second UE. The operations of 1520 may be performed according to the methods described herein. In some examples, aspects of the operations of 1520 may be performed by a beam sweeping configuration transmitter as described with reference to FIGS. 8 through 11.

Figure 16:
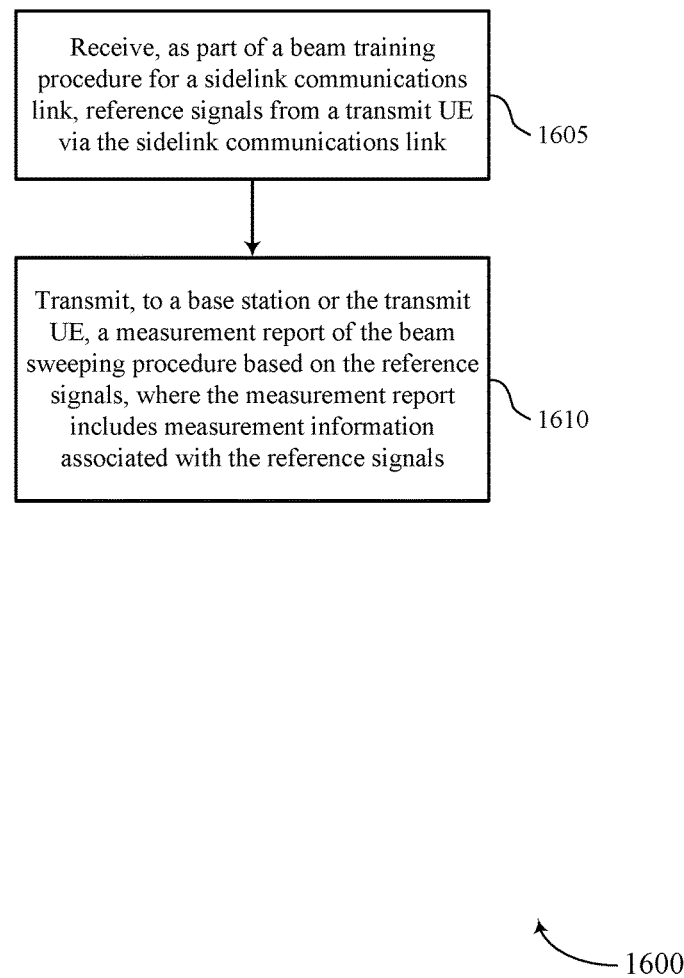

FIG. 16 shows a flowchart illustrating a method 1600 that supports configurations for sidelink beam management in accordance with aspects of the present disclosure. The operations of method 1600 may be implemented by a UE 115 or its components as described herein. For example, the operations of method 1600 may be performed by a communications manager as described with reference to FIGS. 4 through 7. In some examples, a UE may execute a set of instructions to control the functional elements of the UE to perform the functions described below. Additionally or alternatively, a UE may perform aspects of the functions described below using special-purpose hardware.

At 1605, the UE may receive, as part of a beam training procedure for a sidelink communications link, reference signals from a transmit UE via the sidelink communications link. The operations of 1605 may be performed according to the methods described herein. In some examples, aspects of the operations of 1605 may be performed by a reference signal receiver as described with reference to FIGS. 4 through 7.

At 1610, the UE may transmit, to a base station or the transmit UE, a measurement report of the beam sweeping procedure based on the reference signals, where the measurement report includes measurement information associated with the reference signals. The operations of 1610 may be performed according to the methods described herein. In some examples, aspects of the operations of 1610 may be performed by a report transmitter as described with reference to FIGS. 4 through 7.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a first user equipment (UE), comprising:
    transmitting a report that indicates beam sweeping capabilities of the first UE for a sidelink communications link between the first UE and a second UE;
    receiving a signal indicating a configuration for a sidelink beam sweeping procedure for the sidelink communications link between the first UE and the second UE based at least in part on the beam sweeping capabilities of the first UE, the configuration indicating time-frequency resources for a set of transmission beams of the first UE for the sidelink beam sweeping procedure; and performing the sidelink beam sweeping procedure with the second UE using the set of transmission beams and the indicated time-frequency resources based at least in part on the configuration.

2. The method of claim 1, wherein transmitting the report that indicates beam sweeping capabilities of the first UE comprises:
transmitting an indication of a quantity of antenna panels of the first UE.

3. The method of claim 1, wherein transmitting the report that indicates beam sweeping capabilities of the first UE comprises:
transmitting an indication of a quantity of antenna elements per antenna panel of the first UE.

4. The method of claim 1, wherein transmitting the report that indicates beam sweeping capabilities of the first UE comprises:
transmitting an indication of an element type associated with one or more antenna elements of the first UE.

5. The method of claim 1, wherein transmitting the report that indicates beam sweeping capabilities of the first UE comprises:
transmitting an indication of a relative orientation of multiple antenna panels of the first UE.

6. The method of claim 1, wherein transmitting the report that indicates beam sweeping capabilities of the first UE comprises:
transmitting form factor information of the first UE, wherein the form factor information comprises an indication of a change in form factor of the first UE, a change in relative location of one or more antenna panels based on the form factor of the first UE, a current form factor of the first UE, one or more external attachments of the first UE, or any combination thereof.

7. The method of claim 1, wherein transmitting the report that indicates beam sweeping capabilities of the first UE comprises:
transmitting an indication of a UE capability of the first UE, wherein the indication of the UE capability comprises an indication of support for slot-based reception, symbol-based reception, slot-based transmission, symbol-based transmission, a number of beam-switches per slot, or any combination thereof.

8. The method of claim 1, wherein receiving the signal indicating the configuration for the sidelink beam sweeping procedure comprises:
receiving the signal indicating the configuration via downlink control information (DCI), radio resource control (RRC) signaling, or a medium access control (MAC) control element (MAC-CE).

9. The method of claim 1, wherein receiving the signal indicating the configuration for the sidelink beam sweeping procedure comprises:
receiving an indication of the set of transmission beams of the first UE to be used for the sidelink beam sweeping procedure.

10. The method of claim 9, wherein performing the sidelink beam sweeping procedure with the second UE comprises:
transmitting reference signals to the second UE via the set of transmission beams of the first UE and the indicated time-frequency resources;
transmitting a measurement report of the sidelink beam sweeping procedure based at least in part on the reference signals, wherein the measurement report comprises measurement information associated with the reference signals; and
receiving an indication of one or more next transmission beams in response to the measurement report, the one or more next transmission beams for subsequent use in the sidelink beam sweeping procedure.

11. The method of claim 1, further comprising:
transmitting a measurement report of the sidelink beam sweeping procedure;
receiving an indication of a transmission beam based at least in part on the measurement report; and
performing a second sidelink beam sweeping procedure using the transmission beam based at least in part on the indication.

12. The method of claim 1, further comprising:
determining the set of transmission beams of the first UE for the sidelink beam sweeping procedure;
transmitting an indication of the set of transmission beams; and
receiving the signal indicating the configuration for the sidelink beam sweeping procedure in response to the indication.

13. The method of claim 12, further comprising:
transmitting a request to use a first quantity of transmission beams for the sidelink beam sweeping procedure; and
receiving the signal indicating the configuration for the sidelink beam sweeping procedure in response to the request, the configuration comprising a second quantity of transmission beams for the sidelink beam sweeping procedure.

14. The method of claim 13, wherein the first quantity is the same as the second quantity.

15. The method of claim 13, wherein the first quantity is based at least in part on a quantity of beam switches the first UE is capable of performing within a transmission time interval.

16. The method of claim 1, further comprising:
determining the set of transmission beams of the first UE for the sidelink beam sweeping procedure;
determining a beam sweeping pattern including transmission beam repetition for beam sweeping at the second UE for the set of transmission beams; and
transmitting an indication of the beam sweeping pattern for performing the sidelink beam sweeping procedure.

17. The method of claim 16, further comprising:
receiving the signal indicating the configuration for the sidelink beam sweeping procedure in response to the beam sweeping pattern, the configuration indicating the time-frequency resources for the set of transmission beams of the first UE for the sidelink beam sweeping procedure in accordance with the beam sweeping pattern.

18. The method of claim 1, wherein receiving the signal indicating the configuration for the sidelink beam sweeping procedure comprises:
receiving an indication of a first subset of transmission beams of the first UE to be used for the sidelink beam sweeping procedure;
selecting a second subset of transmission beams of the first UE to be used for the sidelink beam sweeping procedure; and
performing the sidelink beam sweeping procedure with the second UE using the first and second subsets of transmission beams.

19. A method for wireless communications at a network device, comprising:
receiving, from a first user equipment (UE), a report that indicates beam sweeping capabilities of the first UE for a sidelink communications link between the first UE and a second UE, the report including an indication of a relative orientation of multiple antenna panels of the first UE; and transmitting, to the first UE, a signal indicating a configuration for a sidelink beam sweeping procedure for the sidelink communications link between the first UE and the second UE based at least in part on the beam sweeping capabilities of the first UE, the configuration indicating time-frequency resources for a set of transmission beams for the sidelink beam sweeping procedure.

20. The method of claim 19, wherein receiving the report that indicates beam sweeping capabilities of the first UE comprises:
receiving an indication of a quantity of antenna panels of the first UE.

21. The method of claim 19, wherein receiving the report that indicates beam sweeping capabilities of the first UE comprises:
receiving an indication of a quantity of antenna elements per antenna panel of the first UE.

22. The method of claim 19, wherein receiving the report that indicates beam sweeping capabilities of the first UE comprises:
receiving an indication of an element type associated with one or more antenna elements of the first UE.

23. The method of claim 19, wherein receiving the report that indicates beam sweeping capabilities of the first UE comprises:
receiving form factor information of the first UE, wherein the form factor information comprises an indication of a change in form factor of the first UE, a change in relative location of one or more antenna panels based on the form factor of the first UE, a current form factor of the first UE, one or more external attachments of the first UE, or any combination thereof.

24. The method of claim 19, wherein receiving the report that indicates beam sweeping capabilities of the first UE comprises:
receiving an indication of a UE capability of the first UE, wherein the indication of the UE capability comprises an indication of support for slot-based reception, symbol-based reception, slot-based transmission, symbol-based transmission, a number of beam-switches per slot, or any combination thereof.

25. The method of claim 19, wherein transmitting the signal indicating the configuration for the sidelink beam sweeping procedure comprises:
transmitting the signal indicating the configuration via downlink control information (DCI), radio resource control (RRC) signaling, or a medium access control (MAC) control element (MAC-CE).

26. The method of claim 19, wherein transmitting the signal indicating the configuration for the sidelink beam sweeping procedure comprises:
transmitting an indication of the set of transmission beams of the first UE to be used for the sidelink beam sweeping procedure.

27. The method of claim 26, further comprising:
receiving a measurement report of the sidelink beam sweeping procedure based at least in part on the indication, wherein the measurement report comprises measurement information associated with one or more reference signals as part of the sidelink beam sweeping procedure; and transmitting a next transmission beam to the first UE in response to the measurement report, the next transmission beam for subsequent use in the sidelink beam sweeping procedure.

28. The method of claim 19, further comprising:
receiving a measurement report of the sidelink beam sweeping procedure from the first UE or the second UE; and
transmitting an indication of a transmission beam for a second sidelink beam sweeping procedure based at least in part on the measurement report.

29. The method of claim 19, further comprising:
receiving, from the first UE, an indication of the set of transmission beams of the first UE for the sidelink beam sweeping procedure; and
transmitting the signal indicating the configuration for the set of transmission beams of the first UE for the sidelink beam sweeping procedure based at least in part on receiving the indication.

30. The method of claim 29, further comprising:
receiving, from the first UE, a request to use a first quantity of transmission beams for the sidelink beam sweeping procedure; and
transmitting an indication of a second quantity of transmission beams for the sidelink beam sweeping procedure in the configuration based at least in part on the request.

31. The method of claim 30, wherein the first quantity is the same as the second quantity.

32. The method of claim 30, wherein the first quantity is based at least in part on a quantity of beam switches the first UE is capable of performing within a transmission time interval.

33. The method of claim 19, further comprising:
receiving, from the first UE, a beam sweeping pattern for performing the sidelink beam sweeping procedure, the beam sweeping pattern including transmission beam repetition for beam sweeping at the second UE; and
transmitting the signal indicating the configuration in response to the beam sweeping pattern.

34. The method of claim 33, wherein the indicated time-frequency resources are for the beam sweeping pattern for the sidelink beam sweeping procedure.

35. A method for wireless communications at a second user equipment (UE), comprising:
transmitting, to a network device or a first UE, a report that indicates beam sweeping capabilities of the second UE for a sidelink communications link between the first UE and the second UE, the report including an indication of a relative orientation of multiple antenna panels of the second UE;
receiving, as part of a sidelink beam sweeping procedure for the sidelink communications link between the first UE and the second UE, one or more reference signals from the first UE via a set of reception beams over time-frequency resources of the sidelink communications link in accordance with a configuration for the sidelink beam sweeping procedure and based at least in part on the beam sweeping capabilities of the second UE, the configuration indicating the time-frequency resources for the sidelink beam sweeping procedure; and
transmitting, to the network device or the first UE, a measurement report of the sidelink beam sweeping procedure based at least in part on the one or more reference signals, wherein the measurement report comprises measurement information associated with the one or more reference signals.

36. The method of claim 35, wherein the measurement report comprises measurements of the one or more reference signals and associated reception beams of the set of reception beams for each of the one or more reference signals.

37. An apparatus for wireless communications at a first user equipment (UE), comprising:
a processor,
memory coupled with the processor; and
instructions stored in the memory and executable by the processor to cause the apparatus to:
transmit a report that indicates beam sweeping capabilities of the first UE for a sidelink communications link between the first UE and a second UE;
receive a signal indicating a configuration for a sidelink beam sweeping procedure for the sidelink communications link between the first UE and the second UE based at least in part on the beam sweeping capabilities of the first UE, the configuration indicating time-frequency resources for a set of transmission beams of the first UE for the sidelink beam sweeping procedure; and
perform the sidelink beam sweeping procedure with the second UE using the set of transmission beams and the indicated time-frequency resources based at least in part on the configuration.

38. The apparatus of claim 37, wherein the instructions to transmit the report that indicates beam sweeping capabilities of the first UE are executable by the processor to cause the apparatus to:
transmit an indication of a quantity of antenna panels of the first UE.

39. The apparatus of claim 37, wherein the instructions to transmit the report that indicates beam sweeping capabilities of the first UE are executable by the processor to cause the apparatus to:
transmit an indication of a quantity of antenna elements per antenna panel of the first UE.

40. The apparatus of claim 37, wherein the instructions to transmit the report that indicates beam sweeping capabilities of the first UE are executable by the processor to cause the apparatus to:
transmit an indication of an element type associated with one or more antenna elements of the first UE.

41. The apparatus of claim 37, wherein the instructions to transmit the report that indicates beam sweeping capabilities of the first UE are executable by the processor to cause the apparatus to:
transmit an indication of a relative orientation of multiple antenna panels of the first UE.

42. The apparatus of claim 37, wherein the instructions to transmit the report that indicates beam sweeping capabilities of the first UE are executable by the processor to cause the apparatus to:
transmit form factor information of the first UE, wherein the form factor information comprises an indication of a change in form factor of the first UE, a change in relative location of one or more antenna panels based on the form factor of the first UE, a current form factor of the first UE, one or more external attachments of the first UE, or any combination thereof.

43. The apparatus of claim 37, wherein the instructions to transmit the report that indicates beam sweeping capabilities of the first UE are executable by the processor to cause the apparatus to:
transmit an indication of a UE capability of the first UE, wherein the indication of the UE capability comprises an indication of support for slot-based reception, symbol-based reception, slot-based transmission, symbol-based transmission, a number of beam-switches per slot, or any combination thereof.

44. An apparatus for wireless communications at a network device, comprising:
a processor,
memory coupled with the processor; and
instructions stored in the memory and executable by the processor to cause the apparatus to:
receive, from a first user equipment (UE), a report that indicates beam sweeping capabilities of the first UE for a sidelink communications link between the first UE and a second UE, the report including an indication of a relative orientation of multiple antenna panels of the first UE; and
transmit, to the first UE, a signal indicating a configuration for a sidelink beam sweeping procedure between the first UE and the second UE based at least in part on the beam sweeping capabilities of the first UE, the configuration indicating time-frequency resources for a set of transmission beams for the sidelink beam sweeping procedure, wherein the sidelink beam sweeping procedure is for the sidelink communications link.

45. The apparatus of claim 44, wherein the instructions to receive the report that indicates beam sweeping capabilities of the first UE are executable by the processor to cause the apparatus to:
receive an indication of a quantity of antenna panels of the first UE.

46. The apparatus of claim 44, wherein the instructions to receive the report that indicates beam sweeping capabilities of the first UE are executable by the processor to cause the apparatus to:
receive an indication of a quantity of antenna elements per antenna panel of the first UE.

47. The apparatus of claim 44, wherein the instructions to receive the report that indicates beam sweeping capabilities of the first UE are executable by the processor to cause the apparatus to:
receive an indication of an element type associated with one or more antenna elements of the first UE.

48. The apparatus of claim 44, wherein the instructions to receive the report that indicates beam sweeping capabilities of the first UE are executable by the processor to cause the apparatus to:
receive form factor information of the first UE, wherein the form factor information comprises an indication of a change in form factor of the first UE, a change in relative location of one or more antenna panels based on the form factor of the first UE, a current form factor of the first UE, one or more external attachments of the first UE, or any combination thereof.

49. The apparatus of claim 44, wherein the instructions to receive the report that indicates beam sweeping capabilities of the first UE are executable by the processor to cause the apparatus to:
receive an indication of a UE capability of the first UE, wherein the indication of the UE capability comprises an indication of support for slot-based reception, symbol-based reception, slot-based transmission, symbol-based transmission, a number of beam-switches per slot, or any combination thereof.

50. An apparatus for wireless communications at a second user equipment (UE), comprising:
a processor,
memory coupled with the processor; and
instructions stored in the memory and executable by the processor to cause the apparatus to:
transmit, to a network device or a first UE, a report that indicates beam sweeping capabilities of the second UE for a sidelink communications link between the first UE and the second UE, the report including an indication of a relative orientation of multiple antenna panels of the second UE;
receive, as part of a sidelink beam sweeping procedure for the sidelink communications link between the first UE and the second UE, one or more reference signals from the first UE via a set of reception beams over time-frequency resources of the sidelink communications link in accordance with a configuration for the sidelink beam sweeping procedure and based at least in part on one or more beam sweeping capabilities of the second UE, the configuration indicating the time-frequency resources for the sidelink beam sweeping procedure; and
transmit, to the network device or the first UE, a measurement report of the sidelink beam sweeping procedure based at least in part on the reference signals, wherein the measurement report comprises measurement information associated with the one or more reference signals.

51. The apparatus of claim 50, wherein the measurement report comprises measurements of the one or more reference signals and associated reception beams of the set of reception beams for each of the one or more reference signals.

* * * * *